United States Patent [19]

Nishimura et al.

[11] Patent Number: 5,607,183
[45] Date of Patent: Mar. 4, 1997

[54] AIR BAG PROVIDED WITH REINFORCING BELTS

[75] Inventors: Kunio Nishimura, Ibaraki; Hideo Nakagawa, Takatsuki; Shiro Kumakawa, Ibaraki, all of Japan

[73] Assignee: Teijin Limited, Osaka, Japan

[21] Appl. No.: 573,867

[22] Filed: Dec. 18, 1995

Related U.S. Application Data

[63] Continuation of Ser. No. 240,724, filed as PCT/JP93/01315, Sep. 14, 1993 published as WO94/06652, Mar. 31, 1994, abandoned.

[30] Foreign Application Priority Data

Sep. 14, 1992 [JP] Japan ................................ 4-269149

[51] Int. Cl.$^6$ ............................................. B60R 21/20
[52] U.S. Cl. .................................. 280/743.2; 280/743.1
[58] Field of Search ........................... 280/728.1, 743.2, 280/743.1, 730.2

[56] References Cited

U.S. PATENT DOCUMENTS

| | | |
|---|---|---|
| 3,938,824 | 2/1976 | Patzelt . |
| 4,921,735 | 5/1990 | Bloch .................... 280/743 A |
| 4,988,118 | 1/1991 | Good ..................... 280/743 R |
| 5,033,771 | 7/1991 | Miyauchi ............... 280/743 A |
| 5,078,423 | 1/1992 | Fujita .................... 280/743 A |
| 5,093,163 | 3/1992 | Krummheuer et al. ...... 280/728 R |
| 5,165,716 | 11/1992 | Imai et al. . |
| 5,178,408 | 1/1993 | Barrenscheen et al. ...... 280/743 R |
| 5,215,795 | 6/1993 | Matsumoto et al. ......... 280/743 R |

FOREIGN PATENT DOCUMENTS

| | | |
|---|---|---|
| 49-82034 | 8/1974 | Japan . |
| 1-122751 | 5/1989 | Japan . |
| 3-164349 | 7/1991 | Japan . |
| 3-197255 | 8/1991 | Japan ................... 280/743 A |
| 3248945 | 11/1991 | Japan . |

*Primary Examiner*—Christopher P. Ellis
*Attorney, Agent, or Firm*—Burgess, Ryan and Wayne

[57] ABSTRACT

An air bag having reinforcing belts and exhibiting a high burst strength and excellent safety, comprises a circular top cloth, a circular bottom cloth seam-joined to the top cloth and having an inflator-joining circular hole located in the center portion thereof, top and bottom reinforcing cloths seam-joined to center portions of the top and bottom cloths and a plurality of reinforcing belts located on inside faces of the top and bottom cloths, in which the air bag and end portion of each reinforcing belt is connected to the top reinforcing cloth or a top belt catcher seam-joined to the top cloth, the opposite end portion of the reinforcing belt is connected to the bottom reinforcing cloth or a bottom belt catcher seam-joined to the bottom cloth and each of the top and bottom cloths is seam-joined to a corresponding reinforcing cloth and optionally a corresponding belt catcher by a plurality of concentrically closed seam lines which satisfies a particular relationship.

31 Claims, 12 Drawing Sheets

AIR BAG PROVIDED WITH REINFORCING BELTS

This application is a continuation, of application Ser. No. 240,724, filed as PCT/JP93/01315, Sep. 14, 1993 published as WO94/06652, Mar. 31, 1994, now abandoned.

TECHNICAL FIELD

The present invention relates to an air bag provided with reinforcing belts. More particularly, the present invention relates to an air bag provided with reinforcing belts and having a high burst strength.

BACKGROUND ART

Recently, air bag systems have become practically employed as a safety device for protecting the occupants of an automobile. Usually, an air bag which was produced by coating a surface of a smooth woven fabric with a chloroprene rubber or silicone rubber, cutting the coated fabric into a circular form, superposing two cut fabric pieces, namely circular top and bottom cloths, on each other, seam-joining them at the circumferential edge portions thereof, and attaching reinforcing belts (straps) to the top and bottom cloths, is used.

Since the air bag is used by inflating it with a gas blown in an instant thereinto, the air bag is required to have no risk of bursting by a rapid raising of the inside pressure thereof, namely a high burst strength. In the air bag provided with the reinforcing belts, the bursting of the air bag is mainly localized and occurs at the connecting portions of the belts and the air bag. To prevent this bursting, various attempts have been made. For example, Japanese Examined Patent Publication (Kokoku) No. 58-41216 discloses that an elastic material such as a bias cloth has been used for the belts.

Also, Japanese Unexamined Patent Publication (Kokai) No. 1-122,751 discloses that reinforcing fabric pieces have been arranged so as to bridge the main air bag portion (a top cloth and a bottom cloth) and the belts and join the main air bag portion with the belts through the reinforcing fabric pieces.

Further, Japanese Unexamined Patent Publication (Kokai) No. 3-164,349 discloses that the main air bag portion has been seam-joined to a belt catcher in a direction at right angles to the longitudinal center line direction of the belt.

Furthermore, in Japanese Unexamined Patent Publication No. 3-248,945, in accordance with the same thinking as in Japanese Unexamined Patent Publication No. 3-164,349, the main air bag portion and the belt catcher are seam-joined to each other along a straight line in a direction at right angles to the longitudinal center line direction of the belt, and this seam is made in a smaller seaming pitch than that in another portion of the air bag.

Nevertheless, the above-mentioned prior arts did not satisfactorily enhance the burst strength, and thus a further enhancement of the burst strength is strongly demanded. Especially, in light weight, compact air bags which are in recent strong demand, development of air bags provided with reinforcing belts and having an excellent burst strength is strongly required.

DISCLOSURE OF THE INVENTION

An object of the present invention is to provide an air bag provided with reinforcing belt and having a high burst strength when inflated.

The air bag of the present invention provided with reinforcing belts comprises:

a substantially circular top cloth formed from a woven fabric;

a substantially circular bottom cloth formed from a woven fabric, superimposed on and seam-joined to the circular top cloth at the circular circumferential edge portions thereof, and having a circular hole formed in the center portion of the bottom cloth, through which hole an inflator can be joined to the air bag;

a top reinforcing cloth located in and seam-joined to the center portion of the circular top cloth and comprising at least one woven fabric piece;

a bottom reinforcing cloth located on and seam-joined to a portion around the inflator-joining circular hole of the circular bottom cloth, and comprising at least one woven fabric piece; and a plurality of reinforcing belts arranged on the inside face of the circular top cloth and on the inside face of the circular bottom cloth and each comprising at least one woven fabric piece, and satisfies a particular relationship (I) as hereinafter indicated.

DESCRIPTION OF THE PREFERRED EMBODIMENTS

To make clear the characteristics in constitution and effects of the air bag of the present invention provided with reinforcing belts, first, a conventional air bag having reinforcing belts will be explained below.

Figure 1A:
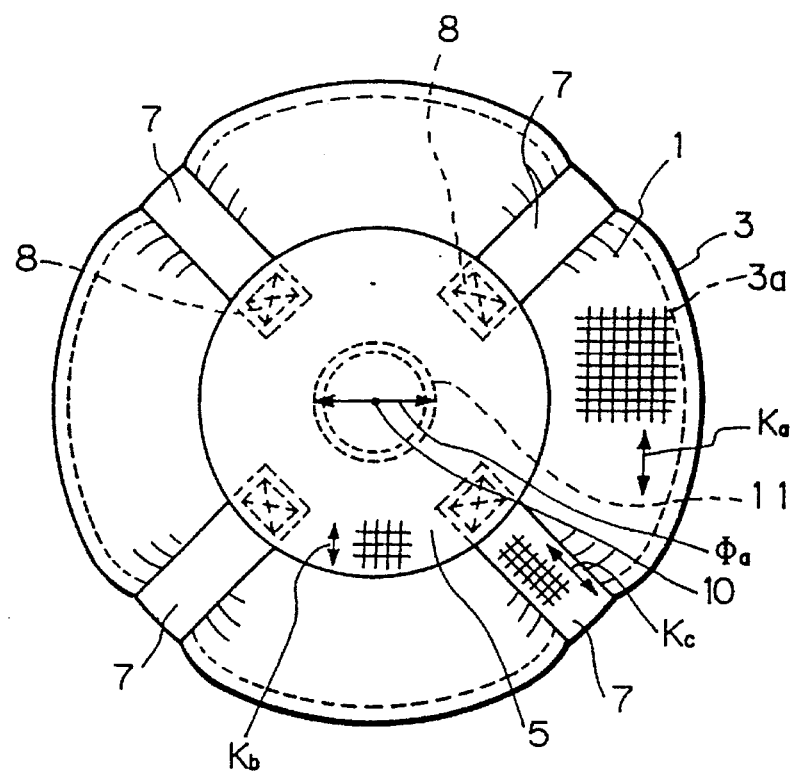
FIG. 1A is an explanatory view of an inside face of a top cloth of an embodiment of a conventional air bag provided with reinforcing belts, when turned inside out before being inflated.
Figure 1B:
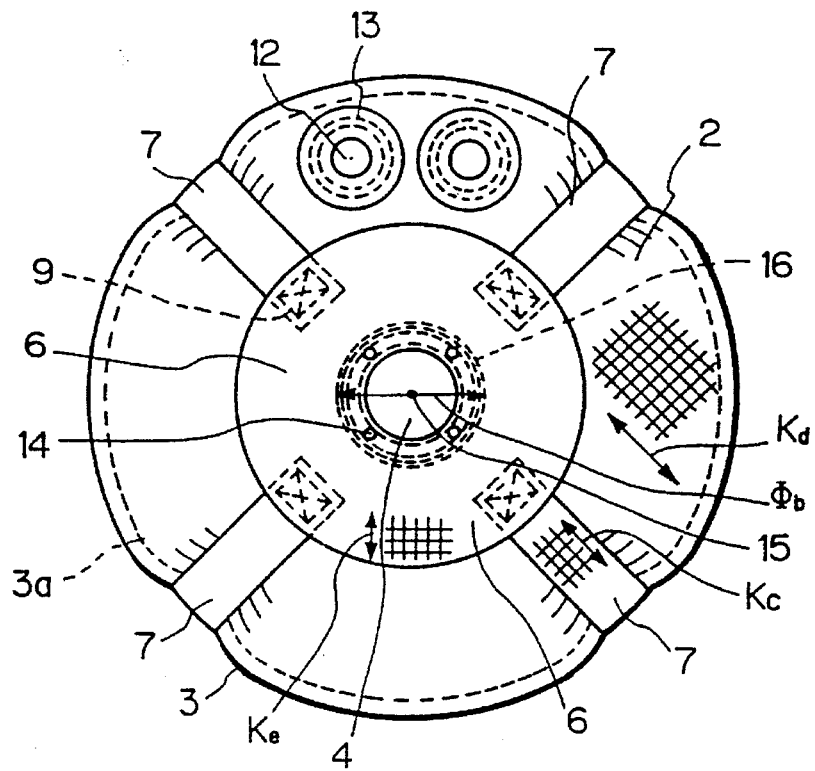
FIG. 1B is an explanatory view of an inside face of a bottom cloth of the conventional air bag of FIG. 1A turned inside out.
Figure 1C:
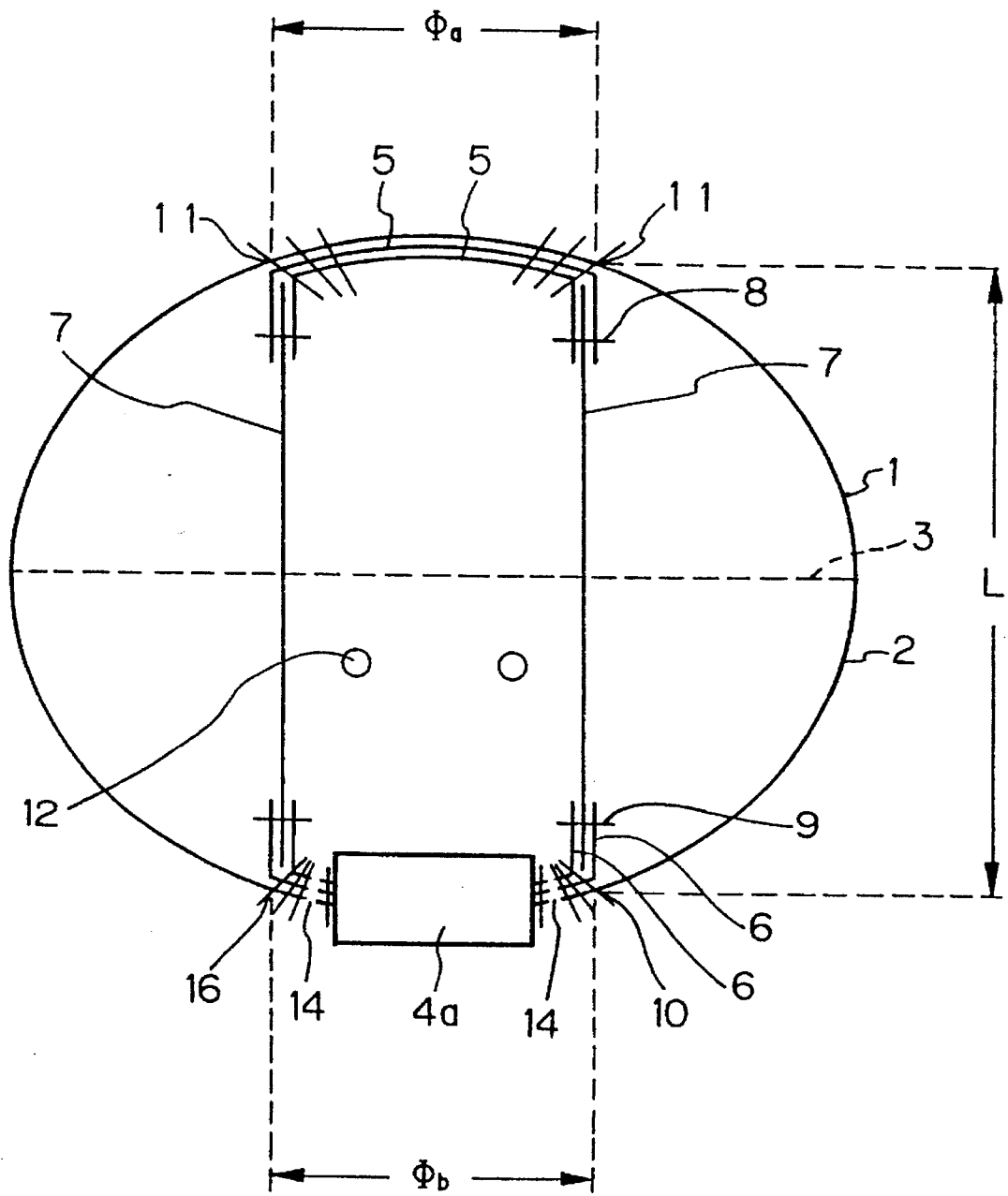
FIG. 1C is an explanatory cross-section of the conventional air bag of FIGS. 1A and 1B when inflated, showing arrangements and seam-joints of reinforcing clothes and reinforcing belts.

A conventional air bag provided with reinforcing belts, as shown in FIGS. 1A, 1B and 1C, comprises a top cloth 1 formed from a woven fabric piece cut into a substantially circular form, and a bottom cloth 2 formed from a woven fabric piece cut into a substantially circular form. The circular top cloth 1 and the circular bottom cloth 2 are superimposed on and seam-joined to each other at circumferential edge portions 3 thereof by a seam line 3a, for example, a double chain stitch seam line.

In a center portion of the circular bottom cloth 2, a circular hole 4 for connecting the cloth 2 to an inflator 4a is formed.

In the center portion of the circular top cloth 1, a top reinforcing cloth 5 consisting of two woven fabric pieces is arranged on and seam-joined to the center portion, in a portion around the inflator-connecting hole 4 of the circular bottom cloth 2, a bottom reinforcing cloth 6 consisting of two woven fabric pieces is arranged on and seam-joined to the portion.

Also, a plurality of, four in FIGS. 1A to 1C, reinforcing belts 7 are arranged between the inside face of the circular top cloth 1 and the inside face of the circular bottom cloth 2, and each of the reinforcing belts is made from at least one (one in FIG. 1C) woven fabric piece.

An end portion of each reinforcing belt is seam-joined to the top reinforcing cloth 5 along a seam line 8, and an opposite end portion of each reinforcing belt is seam-joined to the bottom reinforcing cloth 6 along a seam line 9.

In FIG. 1A, the top cloth 1 is seam-joined to the top reinforcing cloth along concentrically circular multiple seam lines formed around the center 10 of the top cloth 1 and a seam line 11 located in the outermost circumference of the concentrically circular multiple seam lines has a diameter $\phi a$.

As shown in FIG. 1A, the direction Ka of warp yarns of the woven fabric piece from which the top cloth 1 is formed and the direction Kb of warp yarns of the woven fabric piece from which the top reinforcing cloth 5 is formed are parallel to each other, and the warp directions Kc of the woven fabric pieces from which the reinforcing belts 7 are formed, intersect the directions Ka and Kb at bias angles. By the above-mentioned arrangements, when the air bag is inflated by an inflation gas, the reinforcing belts can exhibit an enhanced reinforcing effect for the air bag.

In FIG. 1B, the bottom cloth 2 is provided with two vent holes 12, and vent hole-reinforcing aprons 13 are seam-joined to portions of the bottom cloth 2 around the vent holes 12. Also, the bottom cloth 2 and bottom reinforcing cloth 6 seam-joined to the bottom cloth 2 are provided with a plurality of holes 14 for inflator-fixing bolts, located around the inflator-connecting hole 4. The bottom cloth 2 and the bottom reinforcing cloth 6 are seam-joined to each other along a plurality of concentrically circular seam lines located around the center 15 of the bottom cloth 2, and an outermost circumferential seam line 16 has a diameter $\phi b$.

As shown in FIG. 1B, the warp direction Kd of the woven fabric piece from which the bottom cloth 2 is formed and the warp direction Ke of the woven fabric piece from which the bottom reinforcing cloth 6 is formed intersect each other at a bias angle, and the warp directions Kc of the woven fabric pieces from which the reinforcing belts are formed are parallel to the above-mentioned warp direction Kd and intersect the above-mentioned warp direction Ke at bias angles. Also, the direction of warp or weft yarns of the reinforcing belts 7 is parallel to the longitudiual center lines of the reinforcing belts.

In both the top cloth and the bottom cloth of the conventional air bag, the ratio $\phi a/L$ and the ratio $\phi b/L$ fall outside of the range of from 0.45 to 2.95, and therefore when an inflation gas is blown to inflate the air bag, the air bag is unsatisfactory in the burst strength thereof.

The reinforcing belt-provided air bag of the present invention comprises, in the same way as the conventional air bag as shown in FIGS. 1A to 1C, a circular top cloth, a top reinforcing cloth seam-joined to the circular top cloth, a circular bottom cloth, a bottom reinforcing cloth seam-joined to the bottom cloth, and a plurality, preferably 3 or more, more preferably 4 or more, of reinforcing belts arranged between the inside face of the circular top cloth and the inside face of the circular bottom cloth.

In an embodiment of the reinforcing belt-provided air bag of the present invention, an end portion of each of the reinforcing belts is connected to the top reinforcing cloth, and an opposite end portion of each of the reinforcing belts is connected to the bottom reinforcing cloth. In this case, the top and bottom reinforcing cloths are respectively superimposed on and seam-joined to the inside faces of the top and bottom cloths.

In another embodiment of the reinforcing belt-provided air bag of the present invention, a top belt catcher and a bottom belt catcher each comprising at least one woven fabric piece are respectively arranged on and seam-joined to the inside faces of the top and bottom cloths. An end portion of each reinforcing belt is connected to the top belt catcher and an opposite end portion of each reinforcing belt is connected to the bottom belt catcher. In this case, the top and bottom reinforcing cloths may be respectively arranged on and seam-joined to the inside faces of the top and bottom cloths or the outside faces thereof.

The top cloth and the top reinforcing cloth, or the top cloth, top reinforcing cloth and the top belt catcher are seam-joined to each other along a plurality of concentrically closed seam lines located around the center of the top cloth.

The bottom cloth and the bottom reinforcing cloth or the bottom cloth, the bottom reinforcing cloth and the bottom belt catcher are seam-joined to each other along a plurality of concentrically closed seam lines located around the center of the bottom cloth.

In the reinforcing belt-provided air bag of the present invention among the plurality of concentrically closed seam lines formed on at least one of the top reinforcing cloth and the bottom reinforcing cloth, a closed seam line is located in the outermost circumference thereof and each reinforcing belt must satisfy the relationship (I):

$$0.45 \leq \phi/L \leq 2.95 \tag{I}$$

In the relationship (I), $\phi$ represents a shortest straight line distance between two points at which a straight line drawn through a center of the circular top cloth, or the circular bottom cloth having the closed outermost circumferential seam line, intersects the closed outermost circumferential seam line, and L represents a straight line distance between a point at which a longitudinal center line of the belt intersects the closed outermost circumferential seam line on the top reinforcing cloth and another point at which the longitudinal center line of the belt intersects the closed outermost circumferential seam line of the bottom reinforcing cloth, and measured along the longitudinal center line of the belt.

The reinforcing belt-provided air bag of the present invention satisfying the relationship (I) exhibits an excellent burst strength when inflated by an inflation gas. Namely, generally speaking, when an inflation pressure is applied to an air bag, the burst-starting points of the air bag are concentrated to the closed outermost circumferential seam line portion of the top and/or bottom cloth and the top and/or bottom reinforcing cloth seam-joined thereto, and the burst portions are expanded along the above-mentioned seam line. Also, when inflated, the bursting of the top and bottom cloths by the impact energy of the inflation gas occurs in the center portions thereof. Nevertheless, the reinforcing belt-provided air bag of the present invention satisfying the relationship (I) can absorb the bursting force and the impact energy applied to the closed outermost circumferential seam line with high efficiency and exhibit a significantly enhanced burst strength.

In the above-mentioned relationship (I), when the ratio $\phi/L$ is less than 0.45, the end portions of the resultant reinforcing belt are respectively connected at locations close to the inflator to the top reinforcing cloth or the top belt catcher and to the bottom reinforcing cloth or the bottom belt catcher, and the value of L is large. Therefore, when the inflation gas is blown into the air bag to inflate the air bag, a bursting stress is concentrically applied to the center portions of the top cloth and the bottom cloth, and thus the air bag exhibits a reduced burst strength. Also, when the ratio $\phi/L$ is more than 2.95, the two end portions of the resultant reinforcing belt are respectively connected at locations close to the seam lines in the circular circumferential edge portions of the top cloth and the bottom cloth, to the top and bottom reinforcing cloths or the top and bottom belt catchers, and the length of the reinforcing belt becomes short. Therefore, when the inflation gas is introduced into the air bag, the reinforcing belts cannot fully absorb the impact energy of the inflation gas by an elongation of the belts, and as a result, the air bag exhibits an unsatisfactory burst strength.

When the air bag is inflated, the reinforcing belts serve to pull the top cloth and the bottom cloth toward the inside of the air bag in a direction of an approximately right angle to the outermost circumferential closed seam line of the top or bottom reinforcing cloth. Therefore, no tensile stress is generated in the warp and weft directions of the woven fabric piece from which the top or bottom cloth is formed, and a tensile stress is applied to the warp and weft yarns in radius directions of the yarns. In this case, when the ratio $\phi/L$ value is controlled so that the relationship (I) is satisfied, the tensile stress applied to the yarns becomes minimum and the resultant air bag exhibits a maximum burst strength.

Preferably, the ratio $\phi/L$ value is 0.5 to 2.90, more preferably 0.6 to 2.50.

In the relationship (I) of the present invention, the straight line distance represented by $\phi$ is variable depending on the dimensions of the air bag and the capacity of the inflator and preferably is in the range of from 130 to 550 mm, more preferably from 170 to 500 mm. In the relationship (I), the straight line distance represented by $\phi$ is in the range of from 130 to 550 mm.

Generally, in the reinforcing belts usable for the air bag of the present invention, the direction of the longitudinal center line of each belt preferably intersects both the warp and weft directions of the woven fabric piece from which the reinforcing belt is formed, at a bias angle. This arrangement contributes to enhancing the reinforcing effect of the reinforcing belt.

As mentioned above, in an embodiment of the air bag of the present invention, the two end portions of each reinforcing belt are respectively connected to the top reinforcing cloth and the bottom reinforcing cloth. In this case, the top reinforcing cloth is arranged on and seam-joined to the inside face of the top cloth and the bottom reinforcing cloth is arranged on and seam-joined to the inside face of the bottom cloth.

The top reinforcing cloth and the bottom reinforcing cloth may be in a substantially circular form or a polygonal form, for example, an octagonal form.

The warp or weft direction of the woven fabric piece from which the top cloth, top reinforcing cloth, bottom cloth or bottom reinforcing cloth is formed, can be set forth in consideration of the performances required to the air bag and the direction of the longitudinal center line of the reinforcing belt.

Generally, in the air bag of the present invention, the warp or weft direction of the woven fabric piece from which at least one of the top cloth and the bottom cloth is formed, is parallel to the longitudinal center line direction of the reinforcing belt. By making parallel the warp or weft direction of the woven fabric piece from which the top or bottom cloth is formed, and the longitudinal center line direction of the reinforcing belt to each other, the burst-starting points of the air bag can be concentrated at the outermost circumferential seam line of the cloth and thereby the burst strength of the entire air bag can be enhanced.

Regarding the top cloth and the bottom cloth, the one which can have a higher burst strength than the other, is the bottom cloth. Accordingly, the warp or weft direction of the woven fabric piece from which the bottom cloth is formed is preferably parallel to the longitudinal center line direction of the reinforcing belt and the bottom cloth is seam-joined to the reinforcing belt in the above-mentioned direction. In this case, the warp and weft directions of the woven fabric piece, from which the top cloth is formed, preferably intersect, at a bias angle, the longitudinal center line direction of the reinforcing belt.

When they intersect each other at a bias angle, the intersecting angle is preferably 20 degrees to 70 degrees, more preferably 30 degrees to 60 degrees, still more preferably 40 degrees to 50 degrees. In case where the air bag is practically employed and bursted, the generation of burst-starting points in the bottom cloth contributes to enhancing the safety for the occupants in comparison with the burst starting point generated in the other cloth.

In the air bag of the present invention, the reinforcing cloths are seam-joined to both the top cloth and the bottom cloth so as to satisfy the relationship (I). In this case, preferably the ratio $\phi/L$ value of the top cloth side is close to the $\phi b/L$ value of the bottom cloth side, the warp or weft direction of the bottom cloth-forming woven fabric piece is parallel to the longitudinal center line direction of the reinforcing belt, and the warp or weft direction of the top cloth-forming woven fabric piece intersects the longitudinal center line direction of the reinforcing belt at a bias angle.

For example, preferably, the warp direction of the circular top cloth-forming woven fabric piece is parallel to the warp direction of the top reinforcing cloth-forming woven fabric piece, and the warp direction of the circular bottom cloth-forming woven fabric piece intersects the warp direction of the bottom reinforcing cloth-forming woven fabric piece at a bias angle.

Also, preferably, the warp direction of the circular top cloth-forming woven fabric piece is parallel to the warp direction of the reinforcing belt-forming woven fabric piece, and the warp direction of the circular bottom cloth-forming woven fabric piece intersects the warp direction of the reinforcing belt-forming woven fabric piece at a bias angle.

Further, preferably the warp direction of each of the top and bottom reinforcing cloth-forming woven fabric pieces intersects the longitudinal center line direction of the reinforcing belt seam-joined to the top and bottom reinforcing cloths at a bias angle.

Further, preferably the longitudinal center line direction of the reinforcing belt intersects the warp and weft directions of the reinforcing belt-forming woven fabric belt at a bias angle, the warp directions of the circular top cloth, and the reinforcing belt and the top reinforcing cloth located on the top cloth, are parallel to each other, the warp direction of the circular bottom cloth-forming woven fabric piece intersects the warp direction of the bottom reinforcing cloth-forming woven fabric piece at a bias angle, and the warp directions of the bottom reinforcing cloth-forming woven fabric piece and the reinforcing belt-forming woven fabric piece are parallel to each other.

Furthermore, the warp direction of the circular top cloth-forming woven fabric piece and the top reinforcing cloth-forming woven fabric piece are parallel to each other, and the warp direction of the circular bottom cloth-forming woven fabric piece intersect the warp direction of the bottom reinforcing cloth-forming woven fabric piece at a bias angle.

In the air bag of the present invention, there is no limitation on the type, structure and thickness of the woven fabric pieces for forming the elements of the air bag, and thus those matters can be set forth so as to effectively attain the objects of the present invention.

For example, it is preferable that the top reinforcing cloth and the reinforcing belts located on the circular top cloth be formed from one and the same woven fabric piece, the bottom reinforcing cloth and the reinforcing belts located on the circular bottom cloth be formed from one and the same woven fabric piece, and each of the reinforcing belts on the circular top cloth be seam-joined to a corresponding one of the reinforcing belts on the circular bottom cloth.

In the air bag of the present invention, there is no limitation on the form of the outermost circumferential closed seam line of the top reinforcing cloth and/or the bottom reinforcing cloth, as long as the seam line is closed. Preferably, the outermost circumferential closed seam line is in a substantially circular form.

Also, the closed outermost circumferential seam line can be in a substantially regular square form.

In this case, preferably, each side of the regular square is at right angles to the longitudinal center line direction of the reinforcing belt corresponding to the side.

In an embodiment of the reinforcing belt-provided air bag of the present invention, the two end portions of each reinforcing belt are connected to a top belt catcher and a bottom belt catcher respectively arranged on the inside faces of the top cloth and the bottom cloth. In this case, the top and bottom reinforcing cloths respectively may be arranged on and seam-joined to the inside faces of the top cloth and the bottom cloth, or arranged on and seam-joined to the outside faces thereof.

In the above-mentioned embodiment, the top and bottom belt catchers may be in a substantially circular form. Alternatively, the top and bottom belt catchers are in a polygonal form.

Preferably, the warp direction of the circular top cloth-forming woven fabric piece is parallel to the warp direction of the top belt catcher-forming woven fabric piece, and the warp direction of the circular bottom cloth-forming woven fabric piece intersects the warp direction of the bottom belt catcher-forming woven fabric piece at a bias angle.

Also, preferably, the warp direction of the circular top cloth-forming woven fabric piece is parallel to the warp direction of the reinforcing belt-forming woven fabric piece, and the warp direction of the circular bottom cloth-forming woven fabric piece intersects the warp direction of the reinforcing belt-forming woven fabric piece at a bias angle.

Further, the warp directions of the top and bottom belt catcher-forming woven fabric pieces respectively intersect the longitudinal center line directions of the reinforcing belts seam-joined to the belt catchers at a bias angle.

Further, preferably, the longitudinal center line directions of the reinforcing belts respectively intersect the warp and weft directions of the reinforcing belt-forming woven fabric pieces at a bias angle, the warp directions of the woven fabric pieces from which the circular top cloth, and the reinforcing belts and top belt catcher on the circular top cloth are formed, are parallel to each other, the warp direction of the circular bottom cloth-forming woven fabric piece intersects the warp direction of the bottom belt catcher-forming woven fabric piece at a bias angle, and the warp directions of the woven fabric pieces from which the bottom belt catcher and the reinforcing belts are formed are parallel to each other.

Further, preferably, the warp direction of the circular top cloth-forming woven fabric piece is parallel to the warp direction of the top belt catcher-forming woven fabric piece, and the warp direction of the circular bottom cloth-forming woven fabric piece intersects the warp direction of the bottom belt catcher-forming woven fabric piece.

In the air bag of the present invention having belt catchers and reinforcing belts, preferably, the top belt catcher and the reinforcing belts on the circular top cloth are formed from one and the same woven fabric piece, the bottom belt catcher and the reinforcing belts on the circular bottom cloth are formed from one and the same woven fabric piece, and the reinforcing belts on the circular top cloth are seam-joined to the corresponding reinforcing belts on the circular bottom cloth.

In the air bag of the present invention, it is preferable that the bottom cloth and the inflator-joining circular hole satisfy the relationship (II):

$$32 \leq (\phi k - \phi c)/2 \leq 123 \qquad (II)$$

In the relationship (II), $\phi k$ represents a shortest straight line distance in mm between two points at which a straight line drawn parallel to the warp or weft direction of the circular bottom cloth-forming woven fabric piece, in which direction, the woven fabric piece exhibits a tensile strength lower than in the other direction, intersects the closed outermost circumferential seam line, and φc represents a diameter in mm of the inflator-joining circular hole.

With respect to the distances between an outer hole through which a high pressure gas is blown from the inflator and the outermost-circumferential seam line measured in the warp and weft directions of the bottom cloth-forming woven fabric piece, the burst strength of the air bag depends on the value of one of the above-mentioned distances in one direction in which the bottom cloth exhibits a lower tensile elongation than in the other direction. This dependency is explained by the fact that the burst-starting points of the bottom cloth are not always generated in the bias directions thereof and are generated in one direction of the warp and weft directions in which the bottom cloth exhibits a lower tensile elongation than in the other direction, more particularly are generated on the outermost circumferential seam line on the bottom cloth in warp or weft direction in which the bottom cloth exhibits a lower tensile elongation than in the other direction.

The burst-starting points are never generated on the outermost circumferential seam lines in bias directions of the bottom cloth-forming woven fabric piece, because in the bias direction, the tensile elongation of the bottom cloth is high. Namely, the high pressure gas blown from the inflator immediately impacts an apron and generates a large tensile stress on the outermost circumferential seam line in the warp and weft directions of the bottom cloth-forming woven fabric piece and in a direction at right angles to the outermost circumferential seam line. This is because the seam tensile strength of the outermost circumferential seam line is very small in comparison with the tensile strength of the woven fabric piece per se. Therefore, the air bag bursts an outermost circumferential seam line. In this case, the bursting easily occurs in a direction in which the bottom cloth exhibits a lower tensile elongation than in another directions. This is due to the fact that from the generation of a tensile stress in the outermost circumferential seam line until the bursting occurs, the woven fabric piece elongates in a normal line direction of the outermost circumferential seam line to absorb the inflating energy and to prevent the bursting of the air bag.

If the ultimate elongation of the bottom cloth-forming woven fabric piece in the warp direction is the same as that in the weft direction, the burst-starting points on the outermost circumferential seam line are created in one of the wrap and weft directions in which direction the yarns have a smaller diameter than that in the other direction even if the difference in diameter is small.

In the relationship (II), if the (φk−φc)/2 value is less than 32 mm, the resultant air bag exhibits a reduced burst strength, and if the (φk−φc)/2 value is more than 123 mm, the bursting no longer occurs in the outermost circumferential seam line and the location of the burst-starting points shift from the outermost circumferential seam line to a circular circumferential seam line in which the circumferential edge portions of the top and bottom clothes are seam-joined to each other, and thus the resultant air bag exhibits a reduced burst strength. The (φk−φc)/2 value is preferably in the range of from 45 to 110 mm. The air bag satisfying the relationship (II) can exhibit a further enhanced burst strength.

In the air bag of the present invention, the outermost circumferential closed seam lines of the top and bottom reinforcing cloths preferably have a stitching pitch Pφ in the range of from 1.0 to 2.5 mm, more preferably from 1.2 to 2.3 mm.

Figure 2A:
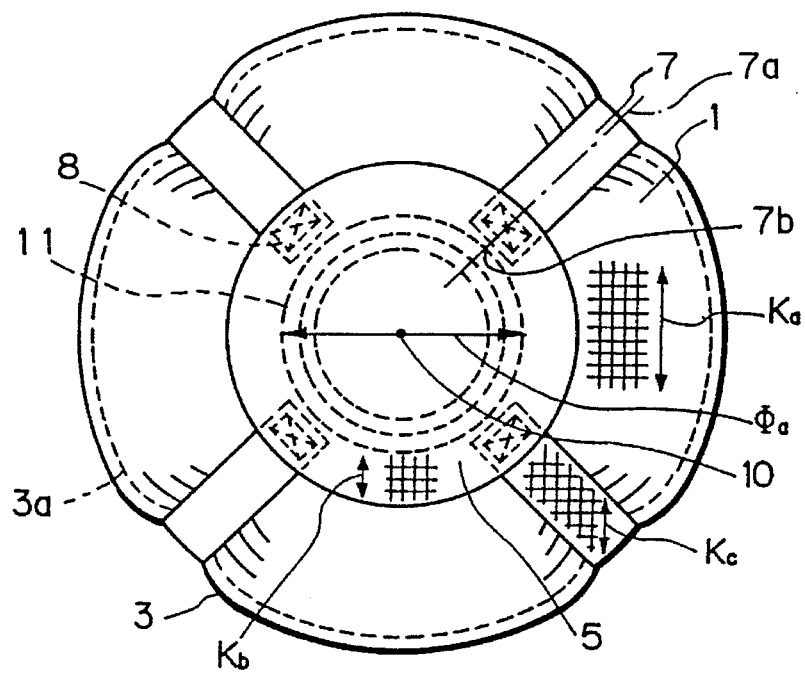
FIG. 2A is an explanatory view of an inside face of a top cloth of an embodiment of the air bag of the present invention provided with reinforcing belts, when turned inside out before being inflated.
Figure 2B:
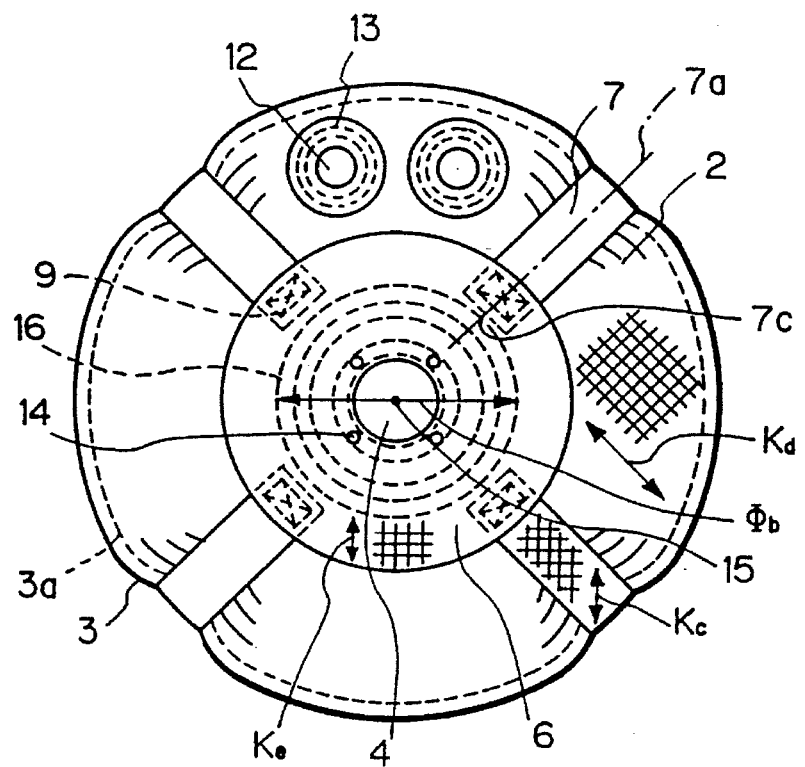
FIG. 2B is an explanatory view of an inside face of a bottom cloth of the air bag of FIG. 2A, when turned inside out.
Figure 2C:
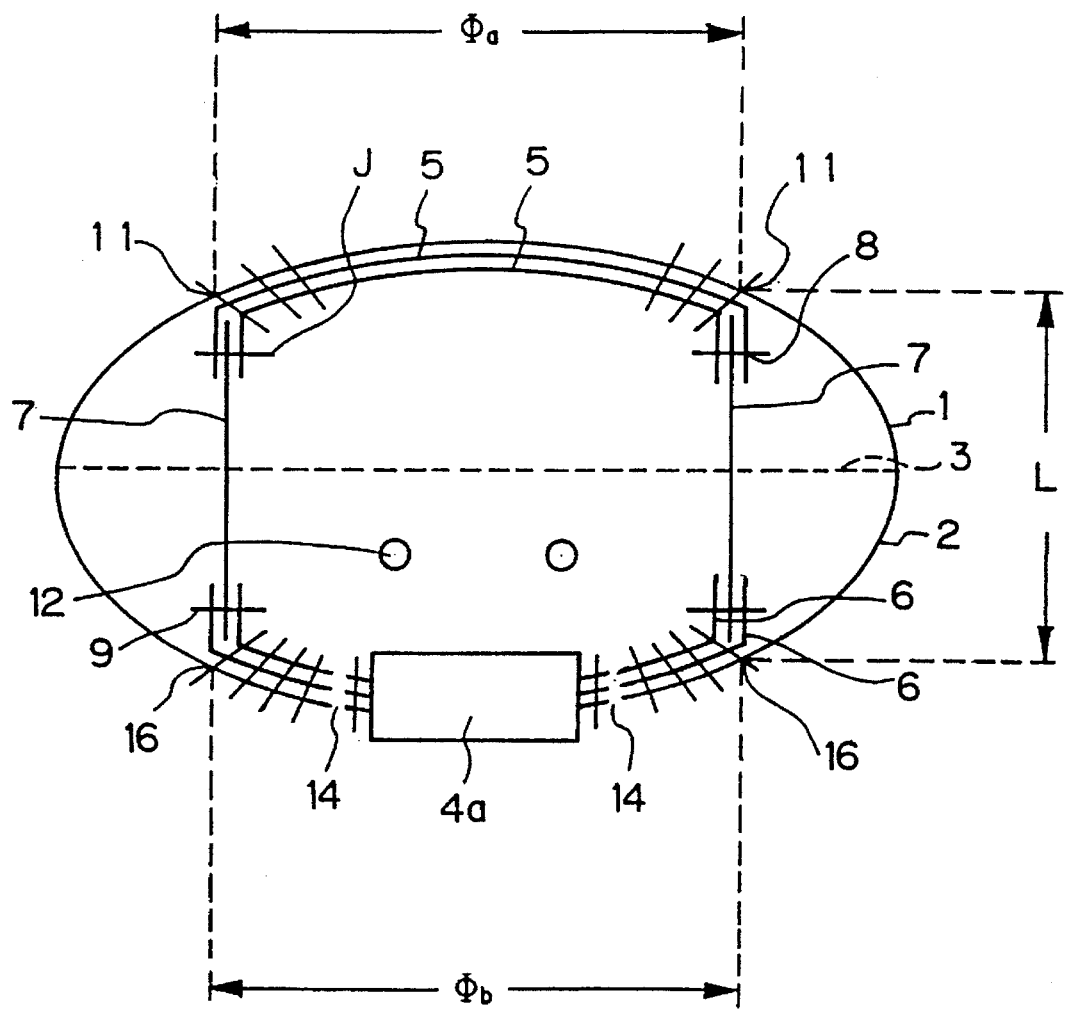
FIG. 2C is an explanatory cross-section of the air bag of FIGS. 2A and 2B, when inflated, showing arrangements and seam joints of reinforcing clothes and reinforcing belts.

An embodiment of the air bag of the present invention having the reinforcing belts is shown in FIGS. 2A to 2C.

In the air bag of the present invention as indicated in FIGS. 2A to 2C, a substantially circular top cloth 1 formed from a woven fabric piece and a substantially circular bottom cloth 2 formed from a woven fabric piece are superimposed on each other and seam-joined to each other at the circumferential edge portions 3 thereof by a seam line 3a.

In a center portion of the circular bottom cloth 2, a circular hole 4 for joining an inflator 4a is formed.

A circular top reinforcing cloth 5 consisting of two woven fabric pieces is arranged on the inside face of the center portion of the circular top cloth 1 and seam-joined thereto by a plurality of concentrically circular seam lines located around the center 10 of the top cloth 1. An outermost circumferential circular seam line 11 is located at the outermost circumference of the seam lines. The outermost circumferential circular seam line 11 has a diameter φa.

A circular bottom reinforcing cloth 6 consisting of two woven fabric pieces is arranged on the inside face of the circular bottom cloth 2 and around the inflator-joining circular hole 4, and seam joined thereto by a plurality of concentrically circular seam lines around the center 15 of the bottom cloth 2, and an outermost circumferential circular seam line 16 is formed at the outermost circumference of the seam lines. This outermost circumferential circular seam line 16 has a diameter φb.

An end portion of each of the reinforcing belts 7 is seam-joined to the circular top reinforcing cloth 5 by seam lines 8, and the opposite end portion thereof is seam-joined to the circular bottom reinforcing cloth 6 by seam lines 9.

In the air bag as shown in FIGS. 2A to 2C, the distance L of each reinforcing belt 7 is a straight line distance between a point 7b at which a longitudinal center line 7a of each reinforcing belt 7 intersects the outermost circumferential circular seam line 11 of the top reinforcing cloth 5 and a point 7c at which the longitudinal center line 7a intersects the outermost circumferential circular seam line 16 of the bottom reinforcing cloth 6, measured along the longitudinal center line 7a.

In the reinforcing belt-provided air bag of the present invention as shown in FIGS. 2A to 2C, the top reinforcing cloth and the reinforcing belts satisfy the relationship:

$$0.45 \leq \phi a/L \leq 2.95$$

and the bottom reinforcing cloth and the reinforcing belts satisfy the relationship:

$$0.45 \leq \phi b/L \leq 2.95$$

As indicated in FIG. 2A, the warp direction Ka of the top cloth 1-forming woven fabric piece and the warp direction Kb of the top reinforcing cloth 5-forming woven fabric piece are parallel to each other.

Also, as indicated in FIG. 2B, the warp direction Kd of the bottom cloth 2-forming woven fabric piece and the warp direction Ke of the bottom reinforcing cloth 6-forming woven fabric piece intersect each other at a bias angle. Also, as indicated in FIGS. 2A and 2B, the warp direction Ka of the top cloth 1-forming woven fabric piece and the warp direction Kc of each reinforcing belt 7-forming woven fabric piece are parallel to each other, and the warp direction Kd of the bottom cloth 2-forming woven fabric piece and the warp direction Kc of each reinforcing belt 7-forming woven fabric piece intersect each other at a bias angle. The intersecting angle is preferably in the range of from 20 degrees to 70 degrees, more preferably 30 to 60 degrees, still more preferably 40 to 50 degrees, as mentioned above. Further, the warp and weft directions of the reinforcing belt-forming woven fabric pieces each intersect the longitudinal center line direction of each reinforcing belt. Namely, the woven fabric for forming the reinforcing belts is cut in a bias direction into a belt form, and the cut woven fabric pieces are used as the reinforcing belts. The reinforcing belt prepared in the above-mentioned manner exhibits a large tensile elongation when the air bag is inflated, and thus can absorb the impact energy applied to the air bag with high efficiency.

Figure 3A:
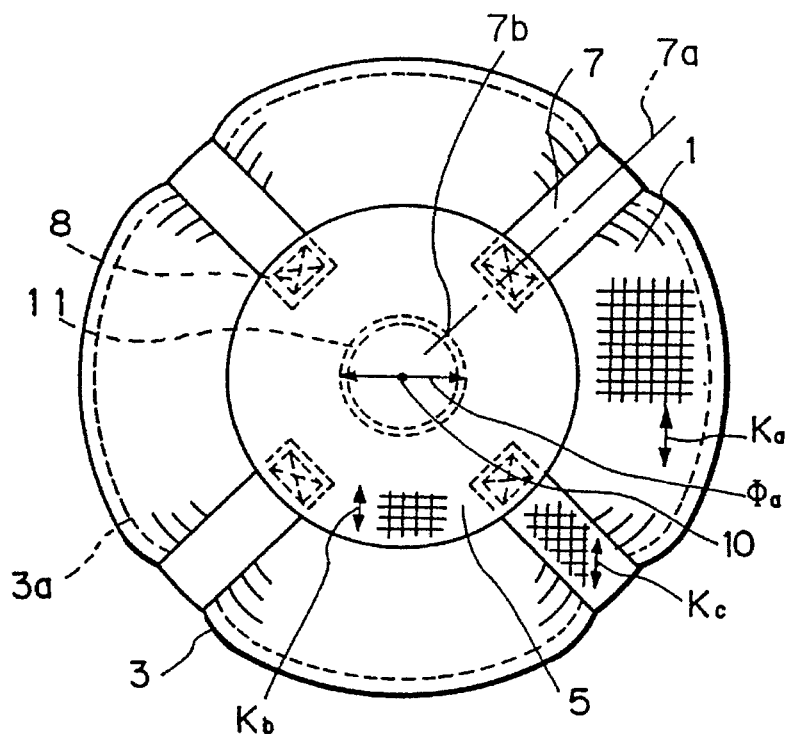
FIG. 3A is an explanatory view of an inside face of a top cloth of another embodiment of the air bag of the present invention provided with reinforcing belts, when turned inside out before being inflated.
Figure 3B:
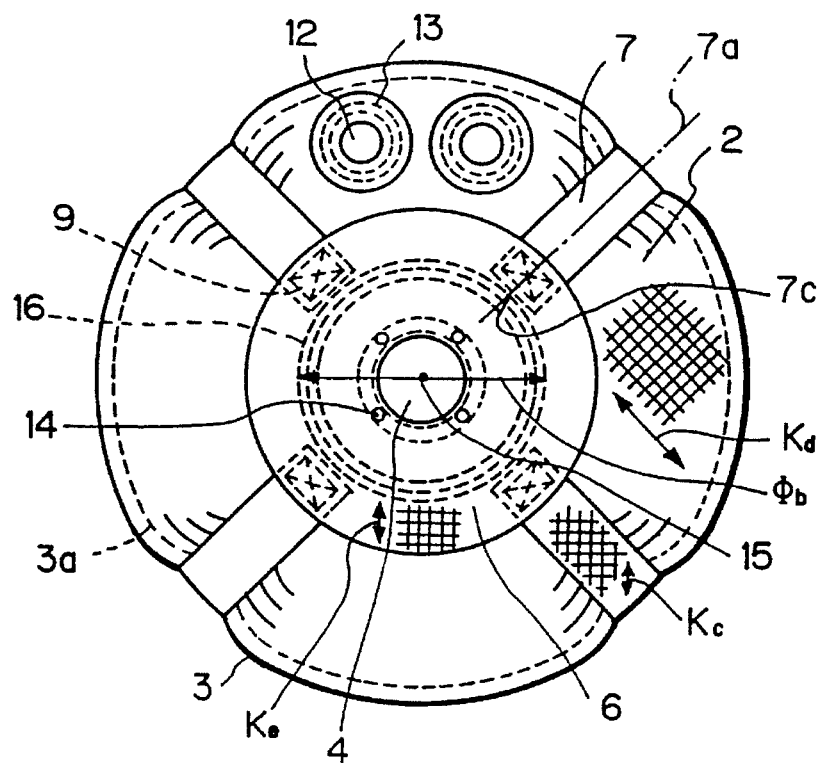
FIG. 3B is an explanatory view of an inside face of a bottom cloth of the air bag of FIG. 3A, when turned inside out.
Figure 3C:
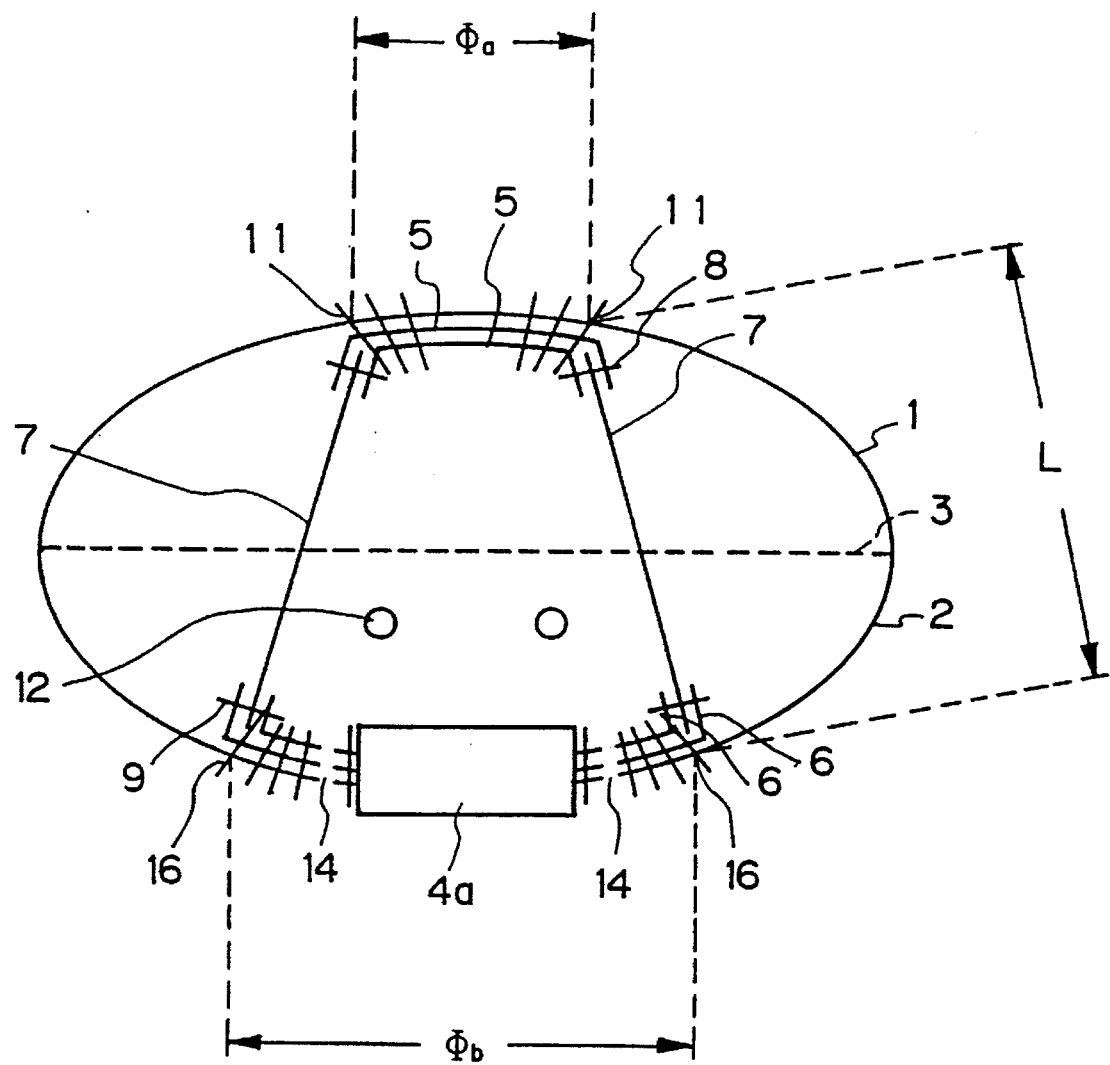
FIG. 3C is an explanatory cross-section of the air bag of FIGS. 3A and 3B, when inflated, showing arrangements and seam joints of reinforcing cloths and reinforcing belts.

The air bag as indicated in FIGS. 3A to 3C has the same constitution as that indicated in FIGS. 2A to 2C, with the following exceptions. Namely, the diameter $\phi a$ of the outermost circumferential circular seam line 11 formed on the circular top reinforcing cloth 5 is relatively small and, as indicated in FIG. 3C, the distance L is relatively large. Therefore, the ratio $\phi a/L$ value does not satisfy the relationship (I). The diameter $\phi b$ of the outermost circumferential circular seam line 16 of the circular bottom reinforcing cloth 6 is, however, relatively large and thus the ratio $\phi b/L$ value satisfies the relationship (I).

Figure 4A:
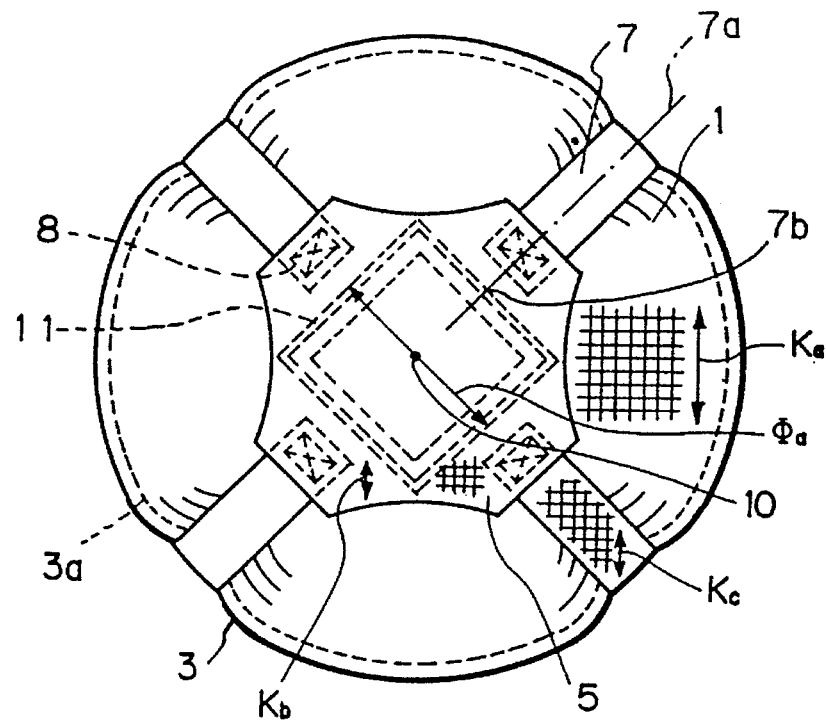
FIG. 4A is an explanatory view of an inside face of a top cloth of still another embodiment of the air bag of the present invention provided with reinforcing belts, when turned inside out before being inflated.
Figure 4B:
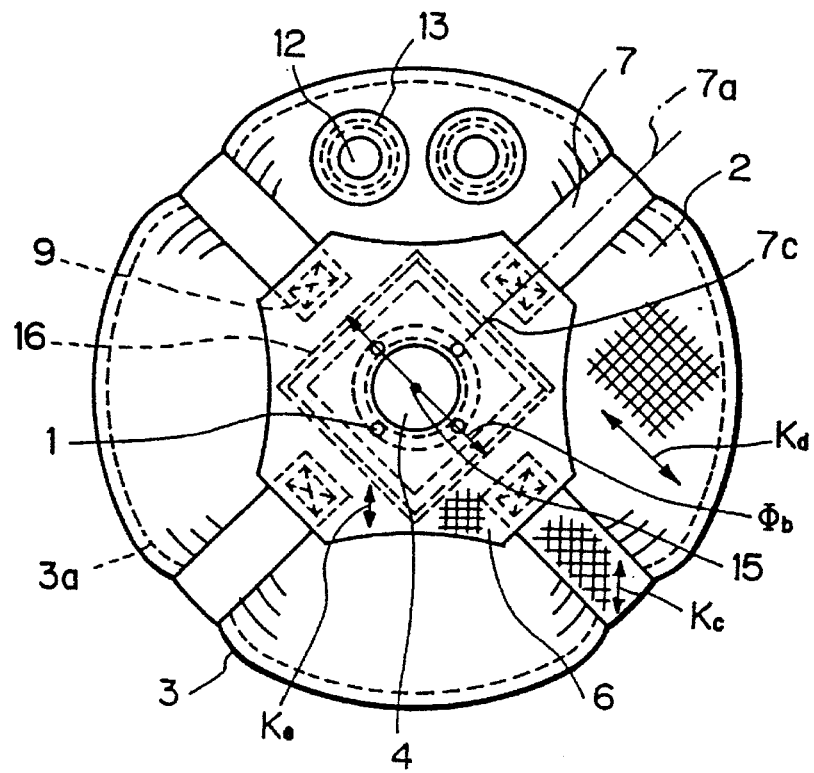
FIG. 4B is an explanatory view of an inside face of a bottom cloth of the air bag of FIG. 4A, when turned inside out.

FIGS. 4A to 4B show a reinforcing belt-provided air bag which is the same as that of FIGS. 2A to 2C with the following exceptions. Namely, in the air bag as shown in FIGS. 4A and 4B, the top and bottom reinforcing cloths 5 and 6 are in an octagonal form, and a plurality of concentrically closed seam lines, especially an outermost circumferential seam line of the top and bottom reinforcing cloths are in a substantially regular square form. In this case, the $\phi a$ value of the outermost circumferential regular square seam line 11 of the top reinforcing cloth 5 is equal to the length of a side of the regular square, and the $\phi b$ value of the outermost circumferential regular square seam line 16 of the bottom reinforcing cloth 6 is equal to a side length of this regular square. Even in this case, the $\phi a$, L and $\phi b$ values should be adjusted, so that the resultant ratio $\phi a/L$ and $\phi b/L$ values fall each in the range of from 0.45 to 2.95.

Figure 5A:
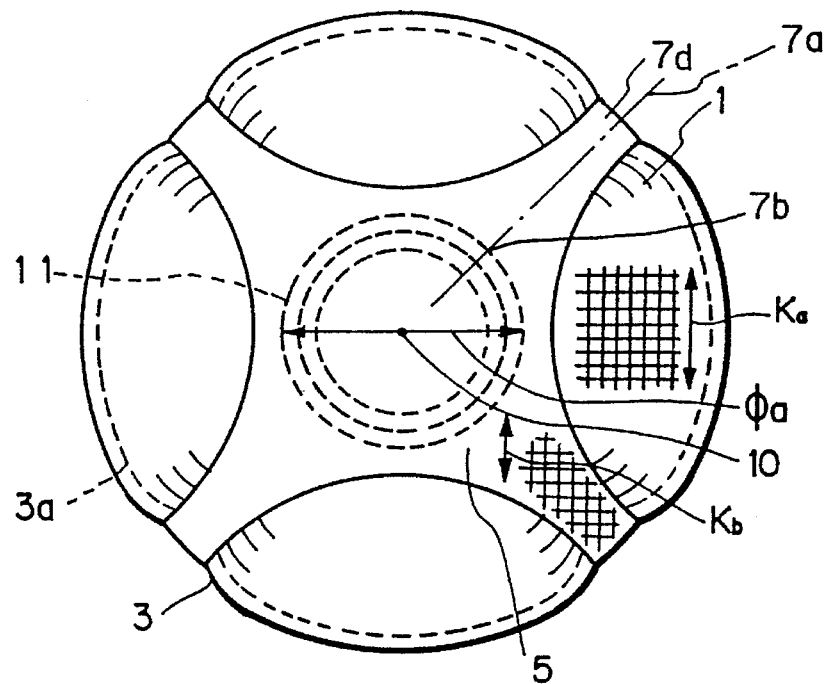
FIG. 5A is an explanatory view of inside face of a top cloth of still another embodiment of the air bag of the present invention provided with reinforcing belts, when turned inside out before being inflated.
Figure 5B:
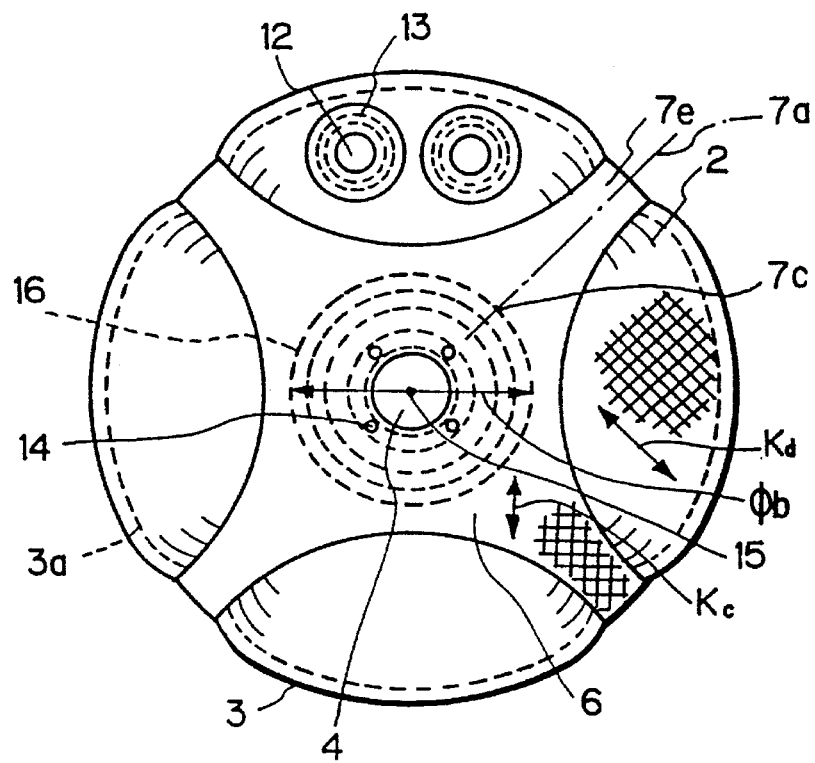
FIG. 5B is an explanatory view of an inside face of a bottom cloth of the air bag of FIG. 5A, when turned inside out.
Figure 5C:
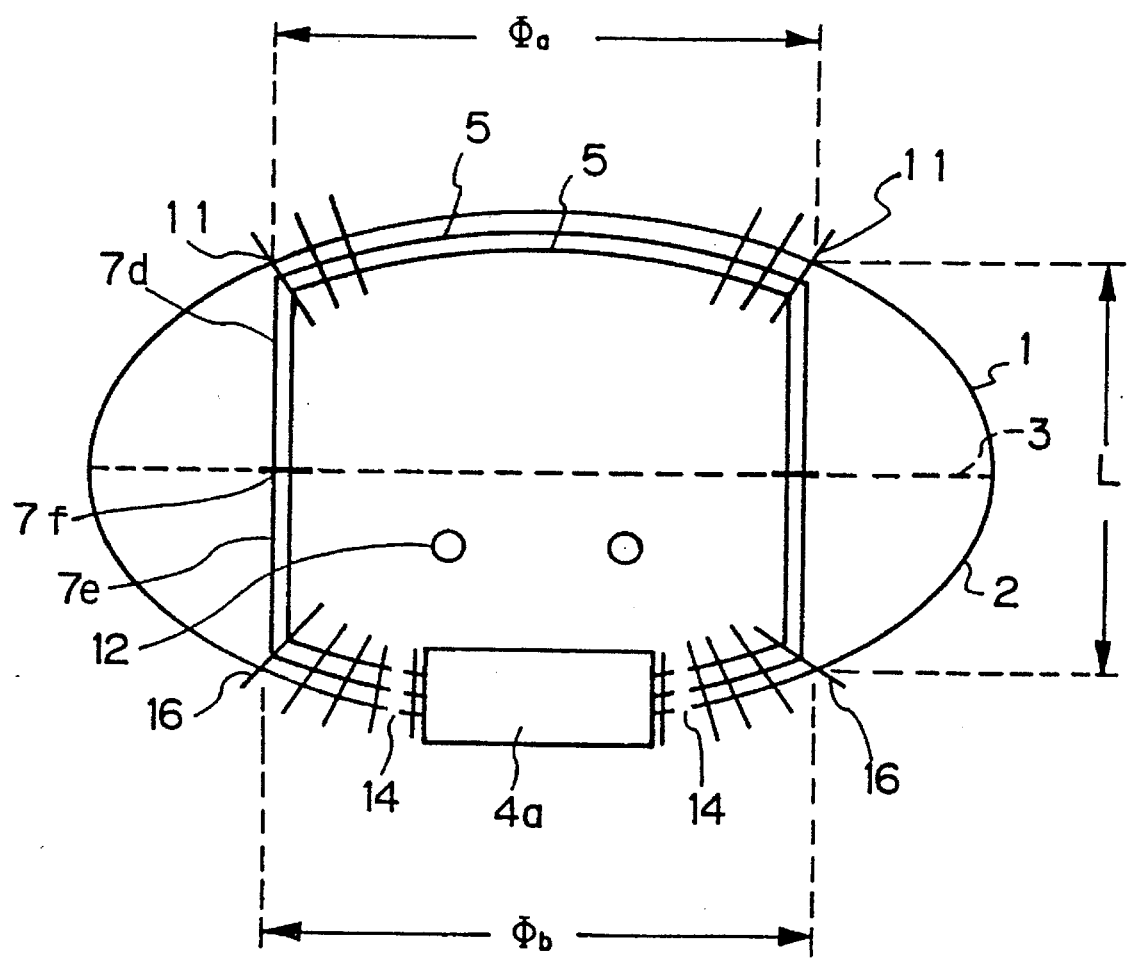
FIG. 5C is an explanatory cross-section of the air bag of FIGS. 5A and 5B, when inflated, showing arrangements and seam joints of reinforcing cloths and reinforcing belts.

The reinforcing belt-provided air bag as shown in FIGS. 5A to 5C is the same as that in FIGS. 2A to 2C with the following exceptions. Namely, the top reinforcing cloth 5 and the reinforcing belt halves 7d are formed from at least one piece (for example, two pieces) of the same woven fabric, the bottom reinforcing cloth 6 and the reinforcing belt halves 7e are formed from at least one piece (for example, two pieces) of the same woven fabric and as shown in FIG. 5C, the reinforcing belt halves 7d and 7c are seam-joined to each other by the seam lines 7f.

In this case, the $\phi a$, $\phi b$ and L values should be adjusted so that the resultant ratio $\phi a/L$ and $\phi b/L$ values fall each in the range of from 0.45 to 2.95.

Figure 6A:
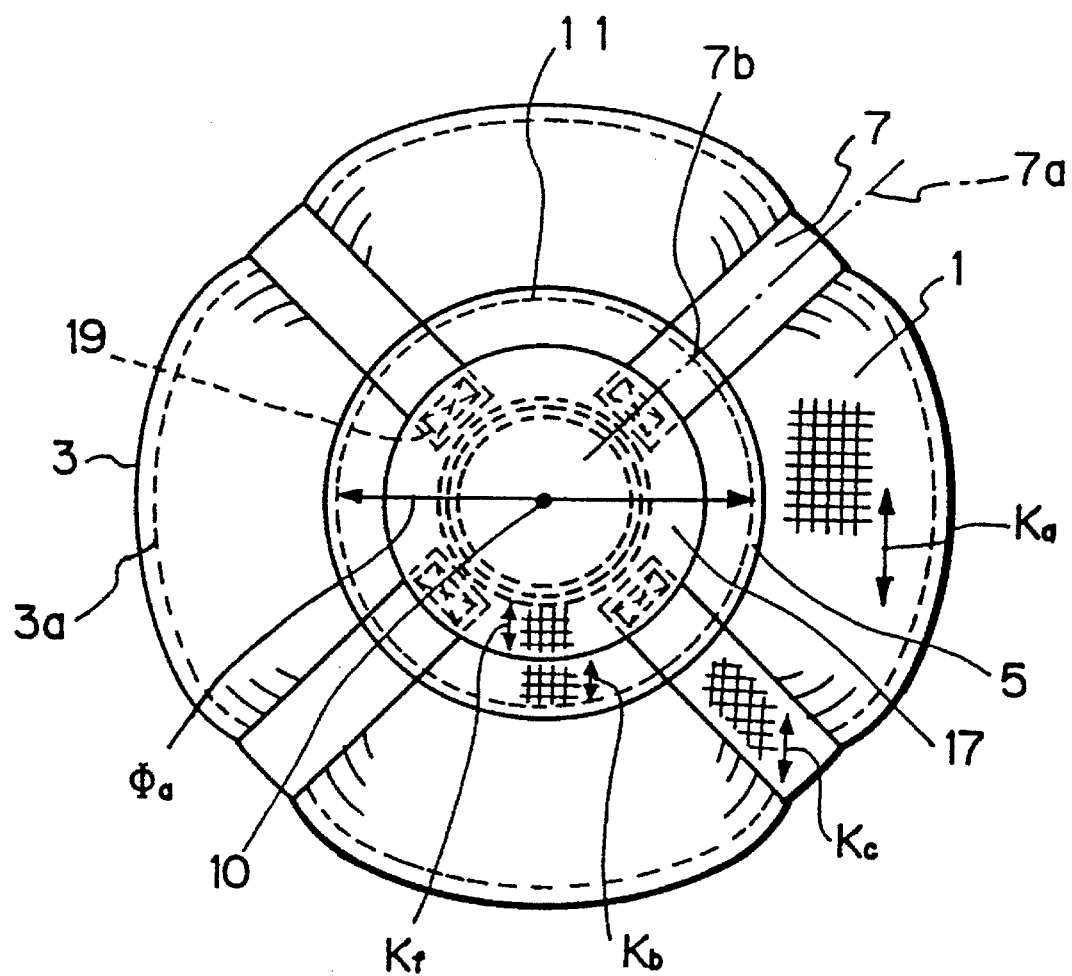
FIG. 6A is an explanatory view of an inside face of a top cloth of further another embodiment of the air bag of the present invention provided with reinforcing belts, when turned inside out before being inflated.
Figure 6B:
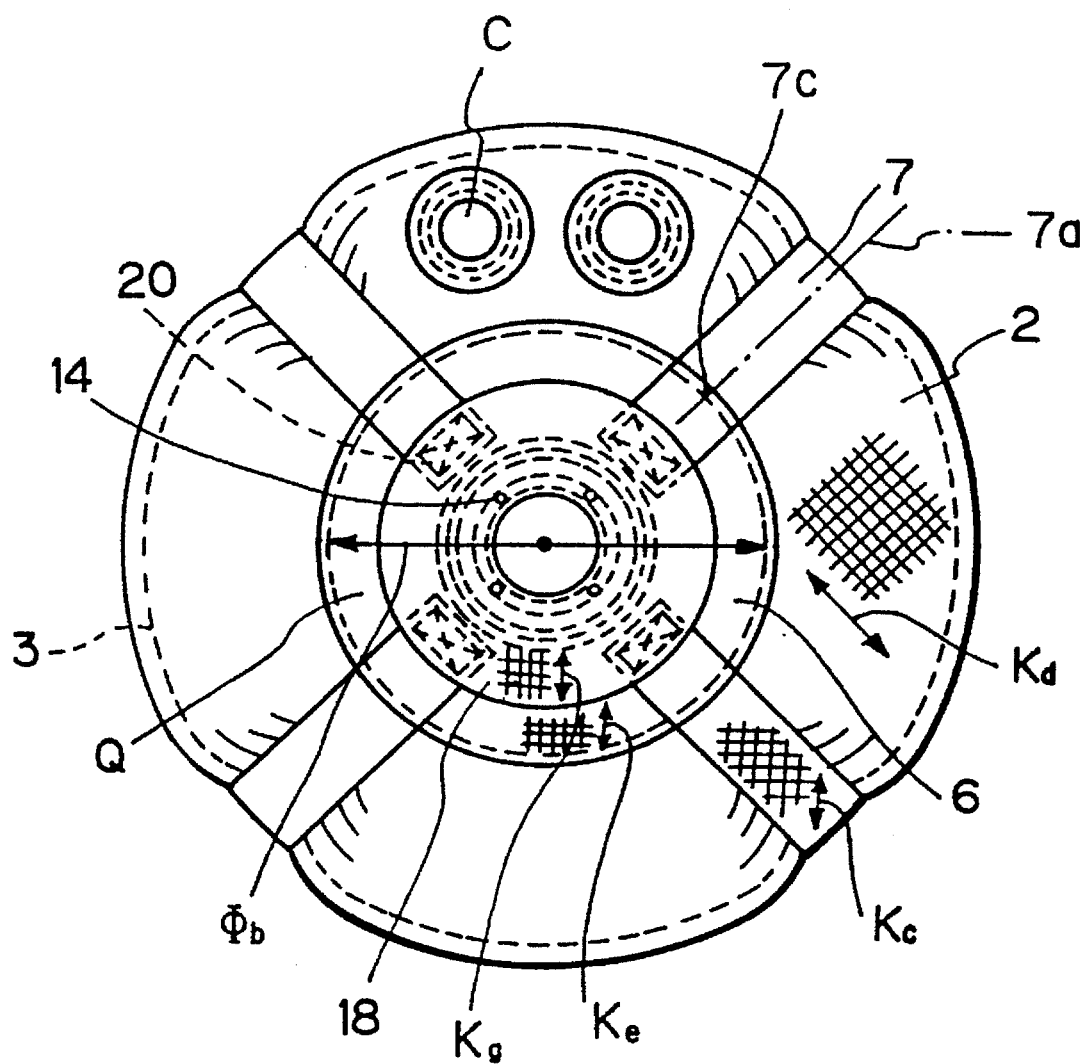
FIG. 6B is an explanatory view of an inside face of a bottom cloth of the air bag of FIG. 6A, when turned inside out.
Figure 6C:
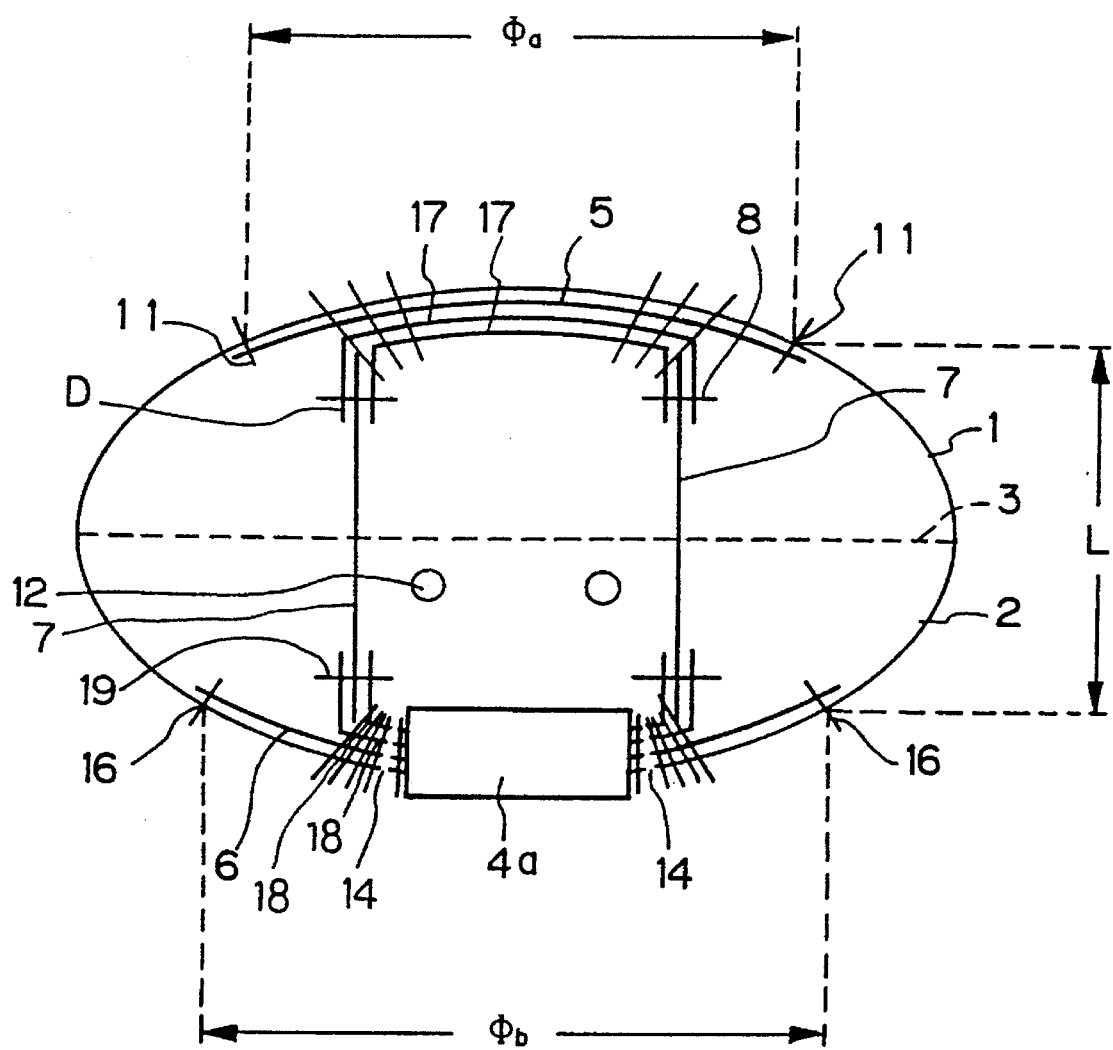
FIG. 6C is an explanatory cross-section of the air bag of FIGS. 6A and 6B, when inflated, showing arrangements and seam joints of reinforcing cloths and reinforcing belts and belt catchers.

The reinforcing belt-provided air bag of the present invention as indicated in FIGS. 6A to 6C is the same as that in FIGS. 2A to 2C with the following exceptions. Namely, a circular top reinforcing cloth 5 is arranged on an inside face of the circular top cloth 1, a circular belt catcher 17 having a smaller diameter than that of the circular top reinforcing cloth 5 is arranged on the top reinforcing cloth 5, and the cloths and the catcher are seam joined to each other by a plurality of concentrically circular seam lines around the center 10 of the circular top cloth 1. The outermost circumferential circular seam line 11 is formed so as to seam-join the circular top reinforcing cloth 5 and the circular top cloth 1 to each other.

An end portion of each reinforcing belt 7 is seam-joined to the top belt catcher 17 by seam lines 19.

Also, a circular bottom reinforcing cloth 6 is arranged on an inside face of the circular bottom cloth 2, and on this bottom reinforcing cloth 6, a circular bottom belt catcher 18 having a smaller diameter than that of the bottom reinforcing cloth 6 is arranged, and they are seam-joined to each other around the inflator-joining circular hole 4 by a plurality of concentrically circular seam lines. By the outermost circumferential circular seam line, the bottom reinforcing cloth and the bottom cloth are seam-joined to each other.

Also, the opposite end portion of each reinforcing belt 7 is seam-joined to the circular bottom belt catcher 18 by seam lines 20.

In the air bag as indicated in FIGS. 6A to 6C, the distance L in the relationship (I) is a straight line distance, when a reinforcing belt 7 is superimposed on the top reinforcing cloth 5 and the bottom reinforcing cloth 5 as shown in FIGS. 6A and 6B, between a point 7b shown in FIG. 6A at which the longitudinal center line 7a of the reinforcing belt 7 intersects the outermost circumferential closed seam line 11 of the top reinforcing cloth, and a point 7c shown in FIG. 6B at which the longitudinal center line 7a intersects the outermost circumferential closed seam line 16 of the bottom reinforcing cloth.

As shown in FIG. 6A, the warp direction Ka of the top cloth 1-forming woven fabric piece, the warp direction Kb of the top reinforcing cloth 5-forming woven fabric piece and the warp direction Kf of the top belt catcher 17-forming woven fabric piece are parallel to each other, and the warp direction Kc of each reinforcing belt 7-forming woven fabric piece is parallel to Ka, Kb and Kf, whereas the warp direction Kc and the longitudinal center line direction of each reinforcing belt intersect each other at a bias angle, and each reinforcing belt 7 has a high tensile elongation in the longitudinal center line direction thereof. By being formed in the above-mentioned manner, the resultant top cloth side portion of the air bag shown in FIG. 6A exhibits an excellent burst strength.

Additionally, the warp direction Kb of the bottom reinforcing cloth 6-forming woven fabric piece, the warp direction Kg of the bottom belt catcher 18-forming woven fabric piece and the warp direction Kc of each reinforcing belt 7-forming woven fabric piece are parallel to each other, and the warp direction Kd of the bottom cloth 2-forming woven fabric piece intersects the above-mentioned warp directions Kb, Kg and Kc, each at a bias angle. In this arrangement of these warp directions, when the resultant air bag is burst by the inflation thereof, the burst-starting points are generated in the bottom cloth side of the air bag, and thereby the burst strength of the top cloth side can be enhanced and the bursting can be prevented.

In FIG. 6C, the straight line distances $\phi a$ and $\phi b$ relating to the outermost circumferential closed seam lines of the top and bottom reinforcing cloths and the straight line distance L relating to the reinforcing belts are such that the ratio $\phi a/L$ and $\phi b/L$ values fall in the range of from 0.45 to 2.95.

In the air bag of the present invention, as illustrated above with reference to FIGS. 2B and 6B, preferably, the longitudinal center line direction of each reinforcing belt 7 is adjusted so as to intersect the warp and weft directions of the reinforcing belt-forming woven fabric piece at bias angles, and also intersects the warp directions of the bottom reinforcing cloth 2-forming woven fabric piece and the bottom belt catcher 18-forming woven fabric piece.

Where the longitudinal center line direction of each reinforcing belt 7 is parallel to the warp or weft direction of the reinforcing belt 7, the possible elongation value of the belt 7 is small and thus when the air bag is inflated, the reinforcing belts cannot fully absorb the impact energy and the air bag exhibits an unsatisfactory burst strength. Also, where the longitudinal center line direction of each reinforcing belt is parallel to the warp or weft direction of the belt catcher-forming woven fabric piece, the possible elongation value of the belt catcher is small and thus the belt catcher cannot fully absorb the impact energy and the air bag exhibits an unsatisfactory burst strength.

As indicated in FIGS. 2A and 2B, or FIGS. 6A and 6B, preferably the top cloth and the bottom cloth are seam-joined together in such a manner that the warp direction of the top cloth-forming woven fabric piece inclined at an angle of 30 to 60 degrees from the warp direction of the bottom cloth-forming woven fabric piece. If this inclination angle is less than 30 degrees or more than 60 degrees, when the resultant air bag is inflated, sometimes, the impact stress applied to the top and/or bottom cloth in the warp and/or weft direction thereof is concentrated to the circumferential double chain seam line 3a of the air bag, and the elongation of the top and/or bottom cloth is hindered. Therefore, the resultant air bag sometimes exhibits an unsatisfactory burst strength. The inclination angle is more preferably 40 to 50 degrees.

In the air bag of the present invention, preferably, the stitching pitch of the outermost circumferential seam lines of the top and bottom reinforcing cloths is 1.0 to 2.5 mm, more preferably 1.5 to 2.0 mm. If this stitching pitch is less than 1.0 mm, sometimes, the sewing operation is difficult, thus the resultant seam line becomes uneven and the resultant air bag exhibits an unsatisfactory burst strength. If the stitching pitch is more than 2.5 mm, the bursting stress is concentrated into each stitch having the large pitch, and thus the resultant air bag sometimes exhibits an unsatisfactory burst strength. Further, the seam lines other than the outermost circumferential seam lines preferably have a stitching pitch in the same range as mentioned above. The sewing yarns for the seam-joining are preferably selected from those having a large ultimate elongation and a low modulus of elasticity. Particularly, sewing yarns composed of nylon 66 multifilament yarns having a thickness of 420 to 1,260 deniers are employed for the present invention. Also, polyester sewing yarns can be employed for the present invention.

In the air bag of the present invention, preferably, the top cloth and the bottom cloth are formed from a woven fabric not coated with a resin, namely a non-coated woven fabric. A resin-coated fabric has an increased weight and thus is not preferable for the present invention. The yarns for forming the top and bottom cloth-forming woven fabric preferably have a total thickness of 150 to 550 deniers. If the total thickness is less than 150 deniers, the resultant air bag sometimes exhibits an unsatisfactory burst strength even when the above-mentioned improvement for the seam-joining is applied. Also, the total thickness is more than 550 deniers, the resultant air bag sometimes exhibits an unsatisfactory feel, weight and size. The total thickness is more preferably 200 to 450 deniers.

Preferably, the individual filament thickness of the filament yarns for forming the top and bottom cloth-forming woven fabric is 0.5 to 6 deniers, more preferably 1 to 3 deniers. If the individual filament thickness is more than 6 deniers, the resultant air bag sometimes exhibits an unsatisfactory feel. Also, if the individual filament thickness is less than 0.5 denier, the resultant air bag sometimes exhibits an unsatisfactory burst strength even when the above-mentioned improvement is applied to the seam-joining.

In the air bag of the present invention the top reinforcing cloth and the top belt catcher are preferably formed from a non-coated fabric. Since the top reinforcing cloth and the top belt catcher seam-joined to the top cloth are located far from the inflator, it is not always necessary to coat the woven fabric for the cloth and the catcher with a resin. In this case, the use of a non-coated woven fabric is effective for making the resultant air bag light weight and compact. The bottom reinforcing cloth and the bottom belt catcher on the bottom cloth side are preferably formed from a coated fabric. In this case, if a non-coated fabric is used, the resultant air bag is easily broken at a portion thereof surrounding the inflator. The top and bottom reinforcing cloths and belt catchers are preferably formed from a woven fabric made from yarns having a total thickness of 150 to 550 deniers, and the filament yarns for forming the woven fabric preferably have an individual filament thickness of 0.5 to 6 deniers.

In the air bag of the present invention, by forming all of the top cloth, the bottom cloth, the top reinforcing cloth, the bottom reinforcing cloth, the reinforcing belts and optionally the belt catchers from polyester woven fabrics, a high compactness can be imparted to the resultant air bag. However, nylon 66 woven fabrics may be employed in place of the polyester woven fabrics. Namely, since the polyester filaments have a higher specific gravity than that of the Nylon 66 filaments, the polyester woven fabric has a volume or thickness smaller than that of another woven fabric having the same bias weight as and a lower filament specific gravity than those of the polyester woven fabric and exhibits an excellent calender processing property. Therefore, the use of the non-coated polyester woven fabric can reduce the gas permeability of the woven fabric by applying the calender treatment thereto. Accordingly, when the polyester woven fabric is utilized without resin coating, the resultant air bag can fully protect the occupant from the inflation gas. Also, the polyester woven fabric is advantageous in that the inside pressure of the resultant air bag can be accurately controlled.

The polyester woven fabric is preferably formed from polyester multifilament yarns. The polyester for forming the polyester filaments includes, for example, polyethylene terephthalate, polybutylene terephthalate, polyhexylene terephthalate, polyethylene naphthalate, polybutylene naphthalate, polyethylene-1,2-bis(phenoxy)ethane-4,4'-dicarboxylate, and copolymers, for example, polyethylene, isophthalate copolymers, polybutylene terephthalate/naphthalate copolymers, and polybutylene terephthalate/decane dicarboxylate copolymers. Among the above-mentioned polyesters, polyethylene terephthalate, which has well-balanced mechanical properties and fiber-forming properties, is preferably employed for the present invention.

Further, the polyester filaments preferably have a dry heat shrinkage of 3 to 12% at a temperature of 150° C. If the dry heat shrinkage at a temperature of 150° C. is more than 12%, the resultant woven fabric exhibits a too large shrinkage due to a setting or calendering after scouring, and thus the even shrinkage of the fabric is rather restricted and gaps formed between the yarns in the fabric becomes large. Therefore, it becomes difficult to produce a woven fabric having a low air permeability and a high smoothness.

Also, if the dry heat shrinkage is less than 3%, it is impossible to produce a woven fabric having a low air permeability and a high smoothness, because the shrinkage of the resultant woven fabric due to the setting or calendering after scouring is too small. The dry heat shrinkage of the polyester filaments at a temperature of 150° C. is more preferably 4 to 11%.

Also, the polyester filaments preferably have a shrinkage of 1 to 7%, more preferably 1 to 6%, in boiling water. If the boiling water shrinkage is more than 7%, the resultant woven fabric is shrunk to an excessively large extent during a scouring or setting procedure and thus wrinkles are frequently generated on the fabric and the calender processability of the fabric is reduced. Therefore, it is difficult to obtain a woven fabric having a low air permeability and a high smoothness.

If the boiling water shrinkage is less than 1%, the shrinkage of the resultant woven fabric during scouring or setting procedure is too low, and thus the resultant woven fabric does not exhibit a low air permeability and a high smoothness.

In the polyester woven fabric usable for the air bag of the present invention, preferably, the woven fabric exhibits a cover factor of 1,050 to 1,400 both in the warp and weft directions thereof. Also, it is preferable that the warp and weft densities of the woven fabric be equal to or close to each other.

The cover factor of the woven fabric in the warp direction refers to a product of a square root of the thickness in denier of the warp yarns with a warp density in yarns/2.54 cm (inch). The cover factor of the woven fabric in the weft direction refers to a product of a square root of the thickness in denier of the weft yarns with a warp density in yarns/2.54 cm (inch). When the cover factor is less than 1,050, the resultant woven fabric exhibits an unsatisfactorily airtightness. Also, when the cover factor is more than 1,400, the resultant woven fabric exhibits a high stiffness and a poor feel and the airtightness of the fabric is not satisfactorily enhanced. A more preferable cover factor is 1,100 to 1,350.

Even where the polyester filament woven fabric has the cover factor falling within the above-mentioned range, if the woven fabric has an extremely high warp density and a reduced weft density, the airtightness thereof is not satisfactorily high and the touch thereof undesirably becomes stiff. Also, this type of woven fabric exhibits an extremely reduced burst strength in one specific direction and thus is not suitable for the air bag.

The non-coated polyester woven fabric usable for the air bag of the present invention is preferably one obtained by applying a calender treatment to the polyester woven fabric in such a manner that at least one surface of the woven fabric is brought into contact with a metal roll in the calendering machine. The metal roll preferably has preferably a surface temperature of 150° to 220° C., more preferably 160° to 200° C., under a roll pressure of 500 kg/cm or more, more preferably 550 to 1,000 kg/cm at a roll speed of 1 to 50 m/min., more preferably 2 to 25 m/min., to obtain better results. In this calendering treatment, to obtain a satisfactory heat-pressing effect, the woven fabric is preferably preheated or calendered at a low speed. The calendering treatment is carried out at least once, or 2 times or more.

The non-coated polyester woven fabric preferably exhibits an air permeability of 0.01 to 0.4 ml/cm$^2$/sec./0.5 inch Aq, as determined by the Frasil method. When the air permeability is more than 0.4 ml/cm$^2$/sec./0.5 inch Aq, the resultant air bag exhibits a reduced airtightness and has a high possibility of breaking upon inflating. Therefore, the risk of the occupants's face being burned by the high temperature gas is increased. Also, the high air permeability causes the control of the inside pressure of the air bag only by the vent holes to be difficult. Also, if the air permeability is less than 0.01 ml/cm$^2$/sec./0.5 inch Aq, the fiber packing of the resultant woven fabric becomes excessively high, the tear strength of the woven fabric falls and as a result, the burst strength of the resultant woven fabric falls. A more preferable air permeability is 0.02 to 0.3 ml/cm$^2$/sec./0.5 inch Aq.

In the air bag of the present invention, as mentioned above, the bottom reinforcing cloth and optionally the bottom belt catcher located on the bottom cloth side are preferably formed from a coated woven fabric. This is because the coated fabric can effectively cut off the high temperature gas upon inflating. The coated woven fabrics usable for this purpose include woven fabrics coated or impregnated with a silicone rubber or chloroprene rubber. As the silicone rubber, an addition reaction type silicone rubber containing a catalyst is preferably utilized. Particularly, dimethyl silicone rubbers, methylvinyl silicone rubbers, methylphenyl silicone rubbers and fluorosilicone rubbers can be used. Among the above-mentioned silicone rubbers, the methyl silicone, which has excellent mechanical properties, a low price and good working properties, is more preferably used. The silicone rubber optionally contains a flame retardant, an inorganic additive such as silica and a filler.

In the air bag of the present invention, by seam joining the reinforcing cloths and optionally the belt catchers so that the outermost circumferential seam lines of the reinforcing cloth arranged on at least one of the top cloth side and the bottom cloth side and the reinforcing belts satisfy the relationship (I), the location of the outermost circumferential seam line at which the burst-starting points are generated and along which the burst proceeds, can be made far from the center of the top or bottom cloth, and thereby the bursting stress can be borne by the large seam line portion so as to reduce the burst stress per unit area of the seam line portion, and simultaneously the absorption of the impact energy can be enhanced and the tensile stress applied to the sewing yarns upon inflating can be made a minimum. According, an air bag having an enhanced burst strength can be obtained.

Further, in this case, by adjusting the value of $\phi$ ($\phi$a and $\phi$b) preferably to 130 to 550 mm, more preferably 170 to 500 mm, the outermost circumferential seam line, in which the bursting stress is borne, can be expanded so that the bursting stress is dispersed in the outermost circumferential seam line portion, and simultaneously the impact energy can be absorbed in a large area. Therefore, an air bag having an excellent burst strength can be obtained.

Further, by arranging the warp or weft direction of the bottom cloth-forming woven fabric piece in parallel with the longitudinal center line direction of each reinforcing belt, even when the resultant air bag bursts, the burst-starting points can be generated in the outermost circumferential seam line of the belt catcher on the bottom cloth side to obtain an air bag having an enhanced safety for the occupants.

Furthermore, in the air bag of the present invention, by seam-joining the reinforcing cloths and optionally the belt catchers in a manner satisfying the relationship (I) in both the top cloth side and the bottom cloth side, and in this case, by arranging the warp or weft direction of the bottom cloth-forming woven fabric piece in parallel with the longitudinal center line direction of each reinforcing belt, an air bag having excellent burst strength, a superior form-retention upon inflation and high safety can be obtained.

EXAMPLES

The present invention will be further explained by way of the following specific examples.

In the examples, the burst strength of the air bag was measured in accordance with the following test method.

(1) Burst Strength

The burst strength (kg/cm$^2$G) of an air bag was measured by rapidly blowing high pressure nitrogen gas thereinto at room temperature.

Examples 1 to 8

In each of Examples 1 to 8, polyester multifilament yarns (trademark: Tetoron, made by Teijin Limited 420 deniers/250 filaments) and nylon 66 multifilament yarns (made by Akzo 420 deniers/72 filaments), each having the physical properties as shown in Table 1, were woven to form a plain weave having a warp and weft density of 57 yarns/inch. The resultant woven fabric was subjected to a scouring step and then a heat-setting step, and finished to such an extent that the resultant woven fabric exhibited a cover factor of 1,230 in the warp and weft directions. Further, the woven fabric was subjected to a calendering treatment at one side surface thereof, to provide a high airtightness woven fabric having an air permeability of 0.05 ml/cm$^2$/sec./0.5 inch Aq (Frasil method).

Some of the woven fabrics were coated with a silicone rubber in a coating amount of 40 g/m$^2$.

The above-mentioned woven fabric was used to provide an air bag having reinforcing belts for a driver's seat.

The constitution details and results of the burst strength test of the air bag are shown in Table 1.

TABLE 1

| Item | | Example No. Example | | | | | | |
|---|---|---|---|---|---|---|---|---|
| | | 1 | 2 | 3 | 4 | 5 | 6 | 7 |
| Top cloth | Type of top cloth | Non-coated polyester woven fabric | Non-coated Nylon 66 woven fabric | Non-coated polyester woven fabric | Non-coated polyester woven fabric | Non-coated polyester woven fabric | Non-coated polyester woven fabric | Non-coated polyester woven fabric |
| | φa | 300 | 300 | 300 | 135 | 240 | 150 | 400 |
| | L | 250 | 250 | 250 | 355 | 255 | 270 | 200 |
| | φa/L | 1.20 | 1.20 | 1.20 | 0.38 | 0.94 | 0.56 | 2.00 |
| | Relationship between reinforcing belt longitudinal center line direction and Ka | Bias intersection | Bias intersection | Bias intersection | Bias intersection | Parallel | Parallel | Bias intersection |
| | Type of top reinforcing cloth | Non-coated polyester woven fabric | Non-coated Nylon 66 woven fabric | Continuous single structure with belts | Continuous single structure with belts | Continuous single structure with belts | Non-coated polyester woven fabric | Non-coated polyester woven fabric |
| | Relationship between reinforcing belt longitudinal center line direction and Kb | Bias intersection | Bias intersection | | | | Bias intersection | Parallel |
| Bottom cloth | Type of bottom cloth | Non-coated polyester woven fabric | Non-coated Nylon 66 woven fabric | Non-coated polyester woven fabric | Non-coated polyester woven fabric | Non-coated polyester woven fabric | Non-coated polyester woven fabric | Non-coated polyester woven fabric |
| | φb | 300 | 300 | 300 | 250 | 500 | 200 | 400 |
| | L | 250 | 250 | 250 | 200 | 160 | 270 | 200 |
| | φb/L | 1.20 | 1.20 | 1.20 | 1.25 | 3.13 | 0.74 | 2.00 |
| | Relationship between reinforcing belt longitudinal center line direction and Kd | Parallel | Parallel | Parallel | Parallel | Bias intersection | Bias intersection | Parallel |
| | Type of bottom reinforcing cloth | Silicone rubber-coated polyester woven fabric | Silicone rubber-coated Nylon 66 woven fabric | Continuous single structure with belts | Continuous single structure with belts | Continuous single structure with belts | Silicone rubber-coated polyester woven fabric | Silicone rubber-coated polyester woven fabric |
| | Relationship between reinforcing belt longitudinal center line direction and Ke | Bias direction | Bias direction | | | | Bias direction | Warp direction |
| Intersecting angle (degree) of Ka of top cloth with Kd of bottom cloth | | 45 | 45 | 45 | 45 | 45 | 45 | 45 |
| Reinforcing belts | Type of reinforcing belt woven fabric | Non-coated polyester woven fabric | Non-coated Nylon 66 woven fabric | Non-coated and silicone rubber-coated polyester woven fabrics (2 sheets) | Non-coated and silicone rubber-coated polyester woven fabrics (2 sheets) | Non-coated and silicone rubber-coated polyester woven fabrics (2 sheets) | Non-coated polyester woven fabric | Non-coated polyester woven fabric |

TABLE 1-continued

| Item | | Example No. Example | | | | | | |
|---|---|---|---|---|---|---|---|---|
| | | 1 | 2 | 3 | 4 | 5 | 6 | 7 |
| Relationship between top cloth-forming woven fabric reinforcing belt longitudinal center line direction and Kc | | Bias intersection | Bias intersection | Bias intersection | Bias intersection | Bias intersection | Bias intersection | Parallel |
| Burst strength (kg/cm² G) | | 2.0 | 2.2 | 2.0 | 2.2 | 1.9 | 1.8 | 2.0 |
| General evolution | | Good | Good | Good | Good | Good | Good | Good |

[Note]
Ka Warp direction of top cloth-forming woven fabric
Kb Warp direction of top reinforcing cloth-forming woven fabric
Kc Warp direction of reinforcing belt-forming woven fabric
Kd Warp direction of bottom cloth-forming fabric
Ke Warp direction of bottom reinforcing cloth-forming woven fabric

Comparative Examples 1 to 7

In each of Comparative Examples 1 to 7, the plain weave as shown in Table 2 was produced from the same polyester multifilament yarn or nylon 66 multifilament yarns as in Examples 1 to 7, and subjected to a scouring treatment and a heat setting treatment. Further, a calendering treatment was applied to one surface of the woven fabric to provide a Woven fabric having a high airtightness. Some of the woven fabrics were coated with a silicone rubber in a coating amount of 40 g/m$^2$. The resultant woven fabric was converted to an air bag having reinforcing belts.

The constitution details and the result of the burst strength test of the air bag are shown in Table 2.

TABLE 2

| Item | | 1 | 2 | 3 | 4 | 5 | 6 | 7 |
|---|---|---|---|---|---|---|---|---|
| | | | | Comparative Example No. | | | | |
| | | | | Comparative Example | | | | |
| Top cloth | Type of top cloth | Non-coated polyester woven fabric | Non-coated Nylon 66 woven fabric | Non-coated polyester woven fabric | Non-coated polyester woven fabric | Non-coated polyester woven fabric | Non-coated polyester woven fabric | Non-coated polyester woven fabric |
| | φa | 140 | 140 | 140 | 140 | 480 | 510 | 540 |
| | L | 350 | 350 | 350 | 350 | 160 | 165 | 180 |
| | φa/L | 0.40 | 0.40 | 0.40 | 0.40 | 3.00 | 3.10 | 3.00 |
| | Relationship between reinforcing belt longitudinal center line direction and Ka | Parallel | Parallel | Parallel | Bias intersection | Parallel | Bias intersection | Parallel |
| | Type of top reinforcing cloth | Non-coated polyester woven fabric | Non-coated Nylon 66 woven fabric | Continuous single structure with belts | Continuous single structure with belts | Continuous single structure with belts | Non-coated polyester woven fabric | Non-coated polyester woven fabric |
| | Relationship between reinforcing belt longitudinal center line direction and Kb | Parallel | Parallel | | | | Bias intersection | Bias intersection |
| Bottom cloth | Type of bottom cloth | Non-coated polyester woven fabric | Non-coated Nylon 66 woven fabric | Non-coated polyester woven fabric | Non-coated polyester woven fabric | Non-coated polyester woven fabric | Non-coated polyester woven fabric | Non-coated polyester woven fabric |
| | φb | 140 | 140 | 140 | 140 | 480 | 510 | 560 |
| | L | 350 | 350 | 350 | 350 | 160 | 165 | 180 |
| | φb/L | 0.40 | 0.40 | 0.40 | 0.40 | 3.00 | 3.10 | 3.10 |
| | Relationship between reinforcing belt longitudinal center line direction and Kd | Warp direction | Warp direction | Warp direction | Warp direction | Bias direction | Warp direction | Bias direction |
| | Type of bottom reinforcing cloth | Silicone rubber-coated polyester woven fabric | Silicone rubber-coated Nylon 66 woven fabric | Non-coated and silicone rubber-coated polyester woven fabrics (2 sheets) | Non-coated and silicone rubber-coated polyester woven fabrics (2 sheets) | Non-coated and silicone rubber-coated polyester woven fabrics (2 sheets) | Silicone rubber-coated polyester woven fabric | Silicone rubber-coated polyester woven fabric |
| | Relationship between reinforcing belt longitudinal center line direction and Ke | Warp direction | Warp direction | | | Continuous single structure with belts | Bias direction | Warp direction |
| Intersecting angle (degree) of Ka of top cloth with Kd of bottom cloth | | 0 | 0 | 0 | 45 | 45 | 45 | 45 |
| Reinforcing belts | Type of reinforcing belt woven fabric | Non-coated polyester woven fabric | Non-coated Nylon 66 woven fabric | | | | Non-coated polyester woven fabric | Non-coated polyester woven fabric |

TABLE 2-continued

| Item | Comparative Example No. | | | | | | |
|---|---|---|---|---|---|---|---|
| | Comparative Example | | | | | | |
| | 1 | 2 | 3 | 4 | 5 | 6 | 7 |
| Relationship between reinforcing belt longitudinal center line direction and Kc | Warp direction | Warp direction | Warp direction | Bias intersection | Bias intersection | Bias intersection | Bias intersection |
| Burst strength (kg/cm² G) | 1.0 | 1.1 | 1.0 | 1.2 | 1.2 | 1.1 | 1.0 |
| General evolution | Bad | Bad | Bad | Bad | Bad | Bad | Bad |

Example 8

A reinforcing belt-provided air bag was produced by the same procedures as in Comparative Example 2, except that a reinforcing cloth formed from a non-coated nylon 66 woven fabric was placed on an inside face of each of the top cloth and the bottom cloth, and seam-joined to each of the top and bottom cloths while adjusting each of $\phi a$ and $\phi b$ values to 300 mm ($\phi a/L=\phi b/L=0.86$), and a belt catcher was placed on and seam-joined to the reinforcing cloth.

The resultant air bag had a burst strength of 2.2 kg/cm² G and its general evaluation result was "good".

Example 9

A reinforcing belt-provided air bag was produced by the same procedures as in Example 6, except that a top reinforcing cloth formed from a non-coated polyester woven fabric was placed on an inside face of the top cloth, and seam-joined to the top cloth by adjusting $\phi a$ to 200 mm ($\phi a/L=0.74$). Also, the same reinforcing cloth-forming woven fabric as in Example 6 was used for the belt catchers. The resultant air bag exhibited a burst strength of 2.0 kg/cm² G and its general evaluation result was "good".

Example 10

An air bag was produced by the same procedures as in Comparative Example 3 except that a bottom reinforcing cloth formed from a non-coated polyester woven fabric was placed on an inside face of the bottom cloth and seam-joined to the bottom cloth while adjusting the $\phi b$ to 500 mm ($\phi b/L=1.43$). Then, the same woven fabric as that used for the bottom reinforcing cloth in Comparative Example 3 was used for the belt catchers. The resultant air bag had a burst strength of 1.8 kg/cm² G and its general evaluation result was "good".

[Industrial Applicability]

In accordance with the present invention, an air bag having an excellent burst strength and a high degree of safety for occupants when inflated can be provided.

We claim:

1. An air bag provided with reinforcing belts, comprising:

a substantially circular top cloth formed from a woven fabric;

a substantially circular bottom cloth formed from a woven fabric, superimposed on and seam-joined to the circular top cloth at the circular circumferential edge portions thereof, and having a circular hole formed in the center portion of the bottom cloth, through which hole an inflator can be joined to the air bag;

a top reinforcing cloth located in an seam-joined to the center portion of the circular top cloth and comprising at least one woven fabric piece;

a bottom reinforcing cloth located on and seam-joined to a portion around the inflator-joining circular hole of the circular bottom cloth, and comprising at least one woven fabric piece; and a plurality of reinforcing belts arranged on the inside face of the circular top cloth and on the inside face of the circular bottom cloth and each comprising at least one woven fabric piece, wherein an end portion of each of the reinforcing belts is connected to one of the top reinforcing cloth and a top belt catcher seam-joined to the top cloth and comprising at least one woven fabric piece, and an opposite end portion of each of the reinforcing belts is connected to one of the bottom reinforcing cloth and a bottom belt catcher seam-joined to said bottom cloth and comprising at least one woven fabric piece;

the top and bottom reinforcing cloths or the top and bottom reinforcing cloths and the top and bottom belt catchers are respectively seam-joined to portions around the centers of the top and bottom cloths by a plurality of concentrically closed seam lines; and in an outermost circumferential closed seam line of at least one of the top reinforcing cloth and bottom reinforcing cloth and each of the reinforcing belts, a shortest straight line distance $\phi$ between two points at which a straight line drawn through a center of at least one of the circular top and bottom cloths having the closed outermost circumferential seam line, intersects the closed outermost circumferential seam line, is in the range of from 130 to 550 mm, and a straight line distance L between an intersecting point of a longitudinal center line of the reinforcing belt with the closed outermost circumferential seam line of the top reinforcing cloth and an intersecting point of the longitudinal center line of the reinforcing belt with the closed outermost circumferential seam line of the bottom reinforcing cloth, measured along the longitudinal center line, is in the range of from 160 to 360 mm, and the shortest straight line distance $\phi$ and the straight line distance L satisfy the relationship (I):

$$1.20 \leq \phi/L \leq 2.95.$$

2. The air bag as claimed in claim 1, wherein the longitudinal center line of the reinforcing belt extends in a direction intersecting, at a bias angle, both a warp direction and a weft direction of the woven fabric piece from which the reinforcing belt is formed.

3. The air bag as claimed in claim 1, wherein each of the reinforcing belts is connected, at each end portion thereof, to the top reinforcing cloth and to the bottom reinforcing cloth.

4. The air bag as claimed in claim 3, wherein the top reinforcing cloth and the bottom reinforcing cloth are in a substantially circular form.

5. The air bag as claimed in claim 3, wherein the top reinforcing cloth and the bottom reinforcing cloth are in a substantially polygonal form.

6. The air bag as claimed in claim 3, wherein a warp direction of the woven fabric piece from which the circular top cloth is formed is parallel to a warp direction of the woven fabric piece from which the top reinforcing cloth is formed, and a warp direction of the woven fabric piece from which the circular bottom cloth is formed, intersects, at a bias angle, a warp direction of the woven fabric piece from which the bottom reinforcing cloth is formed.

7. The air bag as claimed in claim 3, wherein a warp direction of the woven fabric piece from which the circular top cloth is formed is parallel to a warp direction of the woven fabric piece from which the reinforcing belt is formed, and a warp direction of the woven fabric piece, from which the circular bottom cloth is formed, intersects, at a bias angle, a warp direction of the woven fabric piece from which the reinforcing belt is formed.

8. The air bag as claimed in claim 3, wherein a warp direction of each of the top reinforcing cloth and the bottom reinforcing cloth intersects the longitudinal center line direction of the reinforcing belt connected to each of the top and bottom reinforcing cloths, at a bias angle.

9. The air bag as claimed in claim 3, wherein a longitudinal center line direction of the reinforcing belt intersects, at a bias angle, the warp and weft directions of the woven fabric piece from which the reinforcing belt is formed, a warp direction of the woven fabric from which the circular bottom cloth is formed, intersects, at a bias angle, a warp direction of the woven fabric piece from which the bottom reinforcing cloth is formed, and the warp direction of the woven fabric piece from which the bottom reinforcing cloth is formed is parallel to the warp direction of the woven fabric piece from which the reinforcing belt is formed.

10. The air bag as claimed in claim 3, wherein the top reinforcing cloth and belts located on the circular top cloth are formed from the same woven fabric piece, the bottom reinforcing cloth and belts located on the circular bottom cloth are formed from the same woven fabric piece, and the reinforcing belt on the circular top cloth is seam-joined to the corresponding reinforcing belt on the circular bottom cloth.

11. The air bag as claimed in claim 10, wherein the warp direction of the woven fabric piece from which the circular top cloth is formed is parallel to the warp direction of the woven fabric piece from which the top reinforcing cloth is formed, and the warp direction of the woven fabric piece from which the circular bottom cloth is formed intersects, at a bias angle, the warp direction of the woven fabric piece from which the bottom reinforcing cloth is formed.

12. The air bag as claimed in claim 1, wherein the closed outermost circumferential seam line is in a substantially circular form.

13. The air bag as claimed in claim 1, wherein the closed outermost circumferential seam line is in a substantially regular square form.

14. The air bag as claimed in claim 13, wherein each side of the regular square is at a right angle to the longitudinal center line direction of a reinforcing belt corresponding to the side.

15. The air bag as claimed in claim 1, wherein the circular top and bottom cloths are formed from a non-coated woven fabric, and yarns from which the non-coated woven fabric is formed have a thickness of 150 to 550 deniers.

16. The air bag as claimed in claim 1, wherein the top reinforcing cloth and top belt catcher are formed from a non-coated woven fabric, the bottom reinforcing cloth and bottom belt catcher are formed from a coated woven fabric, and the non-coated woven fabric and the coated woven fabric comprises yarns having a thickness of 150 to 550 deniers.

17. The air bag as claimed in claim 1, wherein the reinforcing belts are formed from a non-coated woven fabric.

18. The air bag as claimed in claim 1, wherein each of the circular top and bottom cloths, the top and bottom reinforcing cloths, the top and bottom belt catchers and the reinforcing belts are formed from a polyester fiber woven fabric.

19. The air bag as claimed in claim 1, wherein both end portions of each of the reinforcing belts are respectively connected to the top belt catcher and to the bottom belt catcher.

20. The air bag as claimed in claim 19, herein the top and bottom belt catchers are respectively in a substantially circular form.

21. The air bag as claimed in claim 19, wherein the top and bottom belt catchers are respectively in a polygonal form.

22. The air bag as claimed in claim 19, wherein the warp direction of the woven fabric piece from which the circular top cloth is formed is parallel to the warp direction of the woven fabric piece from which the top belt catcher is formed, and the warp direction of the woven fabric piece from which the circular bottom cloth is formed intersects, at a bias angle, the warp direction of the woven fabric piece from which the bottom belt catcher is formed.

23. The air bag as claimed in claim 19, wherein the warp direction of the woven fabric piece from which the circular top cloth is formed is parallel to the warp direction of the woven fabric piece from which the reinforcing belt is formed, and the warp direction of the woven fabric piece from which the circular bottom cloth is formed intersects, at a bias angle, the warp direction of the woven fabric piece from which the reinforcing belt is formed.

24. The air bag as claimed in claim 19, wherein the warp direction of the woven fabric piece from which one of the top and bottom belt catchers is formed intersects, at a bias angle, the longitudinal center line direction of the reinforcing belt connected to the one of the top and bottom belt catchers.

25. The air bag as claimed in claim 19, wherein the longitudinal center line direction of the reinforcing belt intersects, at a bias angle, the warp and weft directions of the woven fabric piece from which the reinforcing belt is formed, the warp directions of the woven fabric pieces from which the circular top cloth, and the reinforcing belt and the top reinforcing cloth located on the circular top cloth are respectively formed, are parallel to each other, the warp direction of the woven fabric piece from which the circular bottom cloth is formed intersect, at a bias angle, the warp direction of the woven fabric piece from which the bottom belt catcher is formed, and the warp directions of the woven fabric pieces from which the bottom belt catcher and the reinforcing belt are respectively formed are parallel to each other.

26. The air bag as claimed in claim 19, wherein the top belt catcher and the reinforcing belts located on the circular top cloth are formed from one and the same woven fabric piece, the bottom belt catcher and the reinforcing belts located on the circular bottom cloth are formed from one and the same woven fabric piece, and the reinforcing belts located on the circular top cloth are respectively seam-joined to the corresponding reinforcing belts located on the circular bottom cloth.

27. The air bag as claimed in claim 26, wherein the warp direction of the woven fabric piece which the circular top cloth is formed is parallel to the warp direction of the woven fabric piece from which the top belt catcher is formed and the warp direction of the woven fabric piece from which the circular bottom cloth is formed, intersects, at a bias angle, the warp direction of the woven fabric piece from which the bottom belt catcher is formed.

28. The air bag as claimed in claim 1, wherein the closed outermost circumferential seam lines of the top and bottom reinforcing clothes have a stitching pitch of 1.0 to 2.5 mm.

29. The air bag as claimed in claim 1, wherein the warp direction of the woven fabric piece from which the top cloth is formed intersects, at a bias angle, the warp direction of the woven fabric piece from which the bottom cloth is formed.

30. The air bag as claimed in claim 29, wherein the intersection is at an angle of 40 to 50 degrees.

31. The air bag as claimed in claim 3, wherein:

a warp direction of the woven fabric piece from which the circular top cloth is formed is parallel to:

a warp direction of the woven fabric piece from which the top reinforcing cloth is formed and a warp direction of the woven fabric piece from which the reinforcing belt is formed, a warp direction of the woven fabric piece from which the circular bottom cloth is formed, intersects, at a bias angle, a warp direction of the woven fabric piece from which the bottom reinforcing cloth is formed and the warp direction of the woven fabric piece from which the reinforcing belt is formed, the warp direction of the woven fabric, from which the top reinforcing cloth is formed, intersects the longitudinal center line direction of the reinforcing belt connected to the top reinforcing cloth, at a bias angle, the warp direction of the woven fabric from which the bottom reinforcing cloth is formed, intersects the longitudinal center line direction of the reinforcing belt connected to the bottom reinforcing cloth, at a bias angle, the longitudinal center line direction of the reinforcing belt intersects, at a bias angle, the warp and weft directions of the woven fabric piece from which the reinforcing belt is formed, and the warp direction of the woven fabric piece from which the bottom reinforcing cloth is formed, is parallel to the warp direction of the woven fabric piece from which the reinforcing belt is formed.

* * * * *